US009594580B2

(12) United States Patent
Runkis et al.

(10) Patent No.: US 9,594,580 B2
(45) Date of Patent: Mar. 14, 2017

(54) SECURE STORAGE AND ACCELERATED TRANSMISSION OF INFORMATION OVER COMMUNICATION NETWORKS

(71) Applicant: BitSpray Corporation, Clinton, MS (US)

(72) Inventors: Walter H. Runkis, Clinton, MS (US); Jeffrey J. Bromberger, Omaha, NE (US); Peter A. Scott, Boulder, CO (US)

(73) Assignee: BitSpray Corporation, Clinton, MS (US)

( * ) Notice: Subject to any disclaimer, the term of this patent is extended or adjusted under 35 U.S.C. 154(b) by 347 days.

(21) Appl. No.: 14/249,268

(22) Filed: Apr. 9, 2014

(65) Prior Publication Data

US 2015/0293896 A1 Oct. 15, 2015

(51) Int. Cl.
| | |
|---|---|
| *G06F 17/30* | (2006.01) |
| *G06F 9/455* | (2006.01) |
| *H04L 9/06* | (2006.01) |
| *H04L 29/06* | (2006.01) |
| *G06F 3/06* | (2006.01) |
| *H03M 7/30* | (2006.01) |
| *H04L 29/08* | (2006.01) |

(52) U.S. Cl.
CPC ............ *G06F 9/45533* (2013.01); *G06F 3/06* (2013.01); *H04L 9/065* (2013.01); *H04L 63/168* (2013.01); *H03M 7/30* (2013.01); *H04L 67/1097* (2013.01)

(58) Field of Classification Search
CPC .. G06F 17/30; G06F 21/6218; G06F 9/45533; G06F 3/06; H04L 9/065; H04L 63/168

USPC ........................................................ 707/755
See application file for complete search history.

(56) References Cited

U.S. PATENT DOCUMENTS

| | | |
|---|---|---|
| 5,485,474 A | 1/1996 | Rabin |
| 5,572,206 A | 11/1996 | Miller |
| 5,600,726 A | 2/1997 | Morgan et al. |
| 5,991,414 A | 11/1999 | Garay |

(Continued)

FOREIGN PATENT DOCUMENTS

| | | |
|---|---|---|
| JP | 11-134259 | 5/1999 |
| JP | 2002-312225 | 10/2002 |

(Continued)

OTHER PUBLICATIONS

English Language Abstract and Machine Translation of JP 2002-312225 published on Oct. 25, 2002.

(Continued)

*Primary Examiner* — Vincent Boccio
(74) *Attorney, Agent, or Firm* — DLA Piper LLP US

(57) ABSTRACT

A system and method for securely obfuscating, storing, and transmitting digital information includes a computing device configured to parse at least a portion of one or more bit streams to form a plurality of first datasets. The computing device is configured to disperse the plurality of first datasets into multiple data blocks to form t volumes as part of a plurality of second bit streams such that m number of volumes contain a complete data set, wherein m<t. The computing device is also configured to output the t volumes to a plurality of local or distributed storage locations, such that no complete dataset is stored at a single storage location.

56 Claims, 10 Drawing Sheets

(56) References Cited

U.S. PATENT DOCUMENTS

| | | | |
|---|---|---|---|
| 6,141,530 | A | 10/2000 | Rabowsky |
| 6,192,472 | B1 | 2/2001 | Garay |
| 6,243,496 | B1 | 6/2001 | Wilkinson |
| 6,253,337 | B1 | 6/2001 | Maloney |
| 6,718,427 | B1* | 4/2004 | Carlson ................ G06F 3/0617 707/999.002 |
| 6,983,016 | B2 | 1/2006 | Hourunranta |
| 7,328,160 | B2 | 2/2008 | Nishio et al. |
| 7,391,865 | B2 | 6/2008 | Orsini et al. |
| 8,009,830 | B2 | 8/2011 | Orsini |
| 8,613,045 | B1* | 12/2013 | Shigapov ................ H04L 63/08 718/100 |
| 8,700,890 | B2 | 4/2014 | Runkis et al. |
| 2002/0094025 | A1 | 7/2002 | Hanamura et al. |
| 2002/0144152 | A1 | 10/2002 | Ikeda |
| 2003/0149869 | A1 | 8/2003 | Gleichauf |
| 2005/0219611 | A1 | 10/2005 | Yamashita et al. |
| 2006/0171463 | A1 | 8/2006 | Hanamura et al. |
| 2007/0005795 | A1* | 1/2007 | Gonzalez .......... G06F 17/30017 709/232 |
| 2007/0160198 | A1* | 7/2007 | Orsini ................ H04L 9/085 380/28 |
| 2007/0201540 | A1 | 8/2007 | Berkman |
| 2010/0049823 | A1* | 2/2010 | Saigo ................ G06F 11/2066 709/216 |
| 2010/0109907 | A1 | 5/2010 | Sharma |
| 2014/0250300 | A1 | 9/2014 | Runkis et al. |

FOREIGN PATENT DOCUMENTS

| | | |
|---|---|---|
| JP | 2002-358257 | 12/2002 |
| JP | 2003-296179 | 10/2003 |
| JP | 2003-316652 | 11/2003 |
| JP | 2005-267431 | 9/2005 |
| JP | 2006-048158 | 2/2006 |
| JP | 2006-293583 | 10/2006 |
| JP | 2007-329940 | 12/2007 |
| JP | 2008-046860 | 2/2008 |
| WO | WO 2004/028142 | 4/2004 |
| WO | WO 2007-111086 | 10/2007 |
| WO | WO 2007/144215 | 12/2007 |

OTHER PUBLICATIONS

English Language Abstract and Machine Translation of JP 2002-358257 published on Dec. 13, 2002.
English Language Abstract and Machine Translation of JP 2003-316652 published on Nov. 7, 2003.
English Language Abstract and Machine Translation of JP 2007-329940 published on Dec. 21, 2007.
English Language Translation of Japanese Office action issued in related JP Application 2012-513325 on Jan. 26, 2016.
U.S. Appl. No. 09/946,064, filed Mar. 6, 2003, Runkis.
"Clearing the air cloud computing", McKinsey & Company, Mar. 2009.
C. Tshudin et al., "Network Pointers," ACM SIGCOMM Computer Communications Review, vol. 33, No. 1, pp. 23-27, Jan. 2003, see chapter 2.
A. Harrington et al., "Cryptographic Access Control in a Distributed File System," SACMAT'03, pp. 158-165, Jun. 3, 2003, See Chapter 3: figure 2.
S. Pearson, "Taking Account of Privacy when Designing Cloud Computing Services," Proceedings of the 2009 ICSE Workshop on Software Engineering Challenges of Cloud Computing, pp. 44-52, May 23, 2009, see chapter 5.
G. Ateniese, et al., "Improved Poxy-Re-encryption Schemes with Applications to Secure Distributed Storage," ACM Transactions on Information and System Security, vol. 9, No. 1, pp. 1-30, see chapter 3.
International Search Report and Written Opinion issued in PCT/US2010/036703 on Apr. 27, 2010.
Image File Wrapper of Related U.S. Appl. No. 12/790,495.
Image File Wrapper of Related U.S. Appl. No. 14/249,273.
English Language Translation of Japanese Office Action issued in JP 2012-513325 mailed Feb. 3, 2015.
English Language Abstract and Translation for JP 2003-296179 published Oct. 17, 2003.
English Language Abstract and Translation for JP 2006-048158 published Feb. 16, 2006.
English Language Abstract and Translation for JP 2006-293583 published Oct. 26, 2006.
English Language Abstract for JP 11-134259 published May 21, 1999.
English Language Abstract and Translation for JP 2008-046860 published Feb. 28, 2008.
English Language Abstract for WO 2007-111086 published Oct. 4, 2007.
Written Opinion of the International Searching Authority and International Search Report issued in International Patent Application No. PCT/US15/24935 dated Jul. 20, 2015.
International Preliminary Report on Patentability issued in International Application No. PCT/US2015/024935 dated Oct. 12, 2016.
Appeal Decision of Rejection issued in JP 2012-513325 dated Nov. 15, 2016.
Partial English Translation of Appeal Decision of Rejection issued in JP 2012-513325 dated Nov. 15, 2016.

* cited by examiner

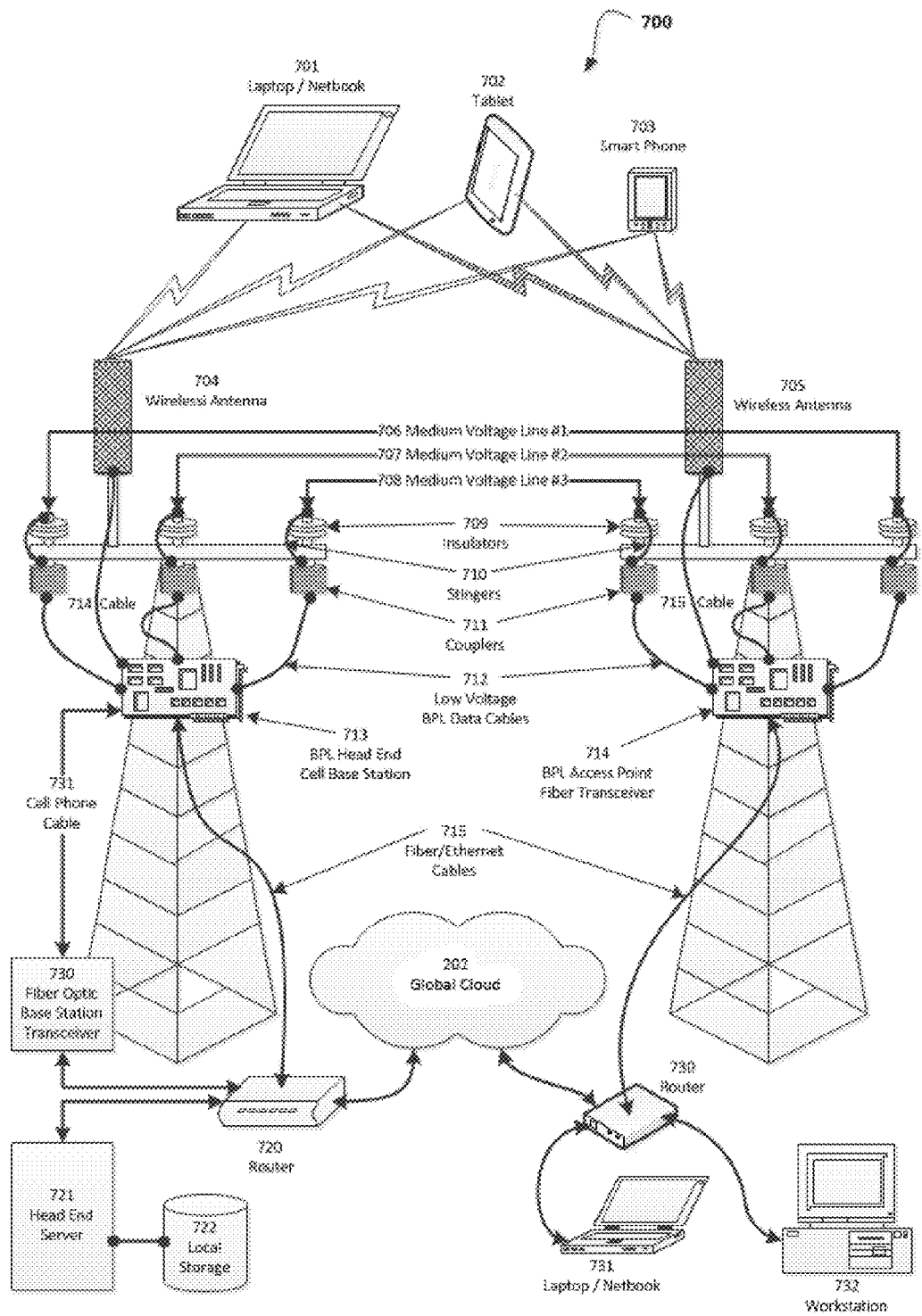

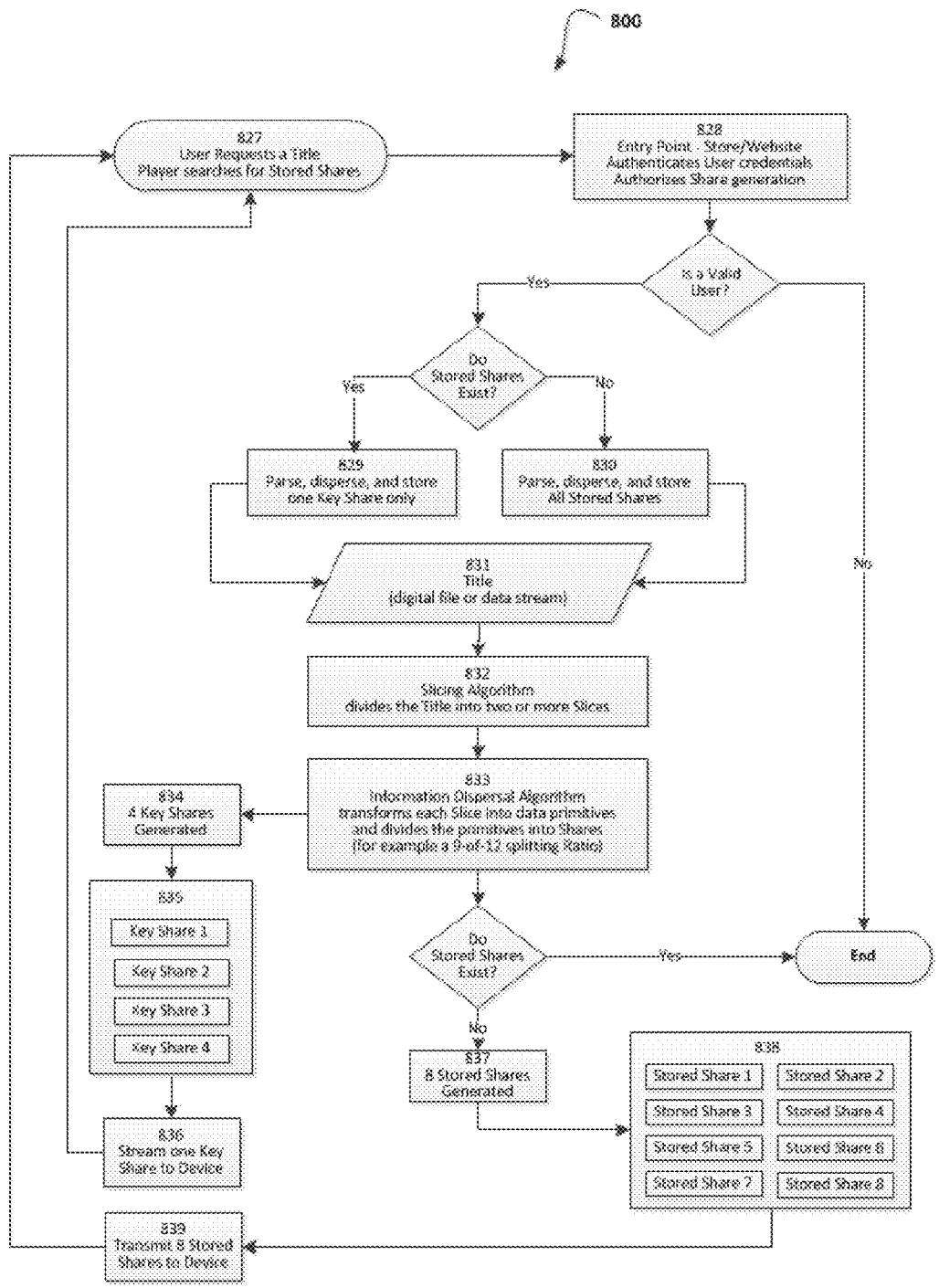

SECURE STORAGE AND ACCELERATED TRANSMISSION OF INFORMATION OVER COMMUNICATION NETWORKS

FIELD

The present disclosure is directed to the field of storage and transmission of information over communication networks and, more particularly, towards systems and methods for obfuscating information, securely storing information, and accelerating the transmission rates of information over communication networks.

BRIEF DESCRIPTION OF THE FIGURES

FIG. 7 is a schematic diagram representation of a system 700 for dispersing information to increase security, persistence, and availability of a communication network that is transmitted over an electric utility power grid according to a disclosed embodiment.

FIG. 8a is a schematic diagram representation of a system 800 and FIG. 8b is a flow chart representation of a system 800 for dispersing content to reduce piracy and increasing security, persistence, and availability of audio and/or video assets over a communication network according to a disclosed embodiment.

DETAILED DESCRIPTION OF SEVERAL EMBODIMENTS

Figure 1:
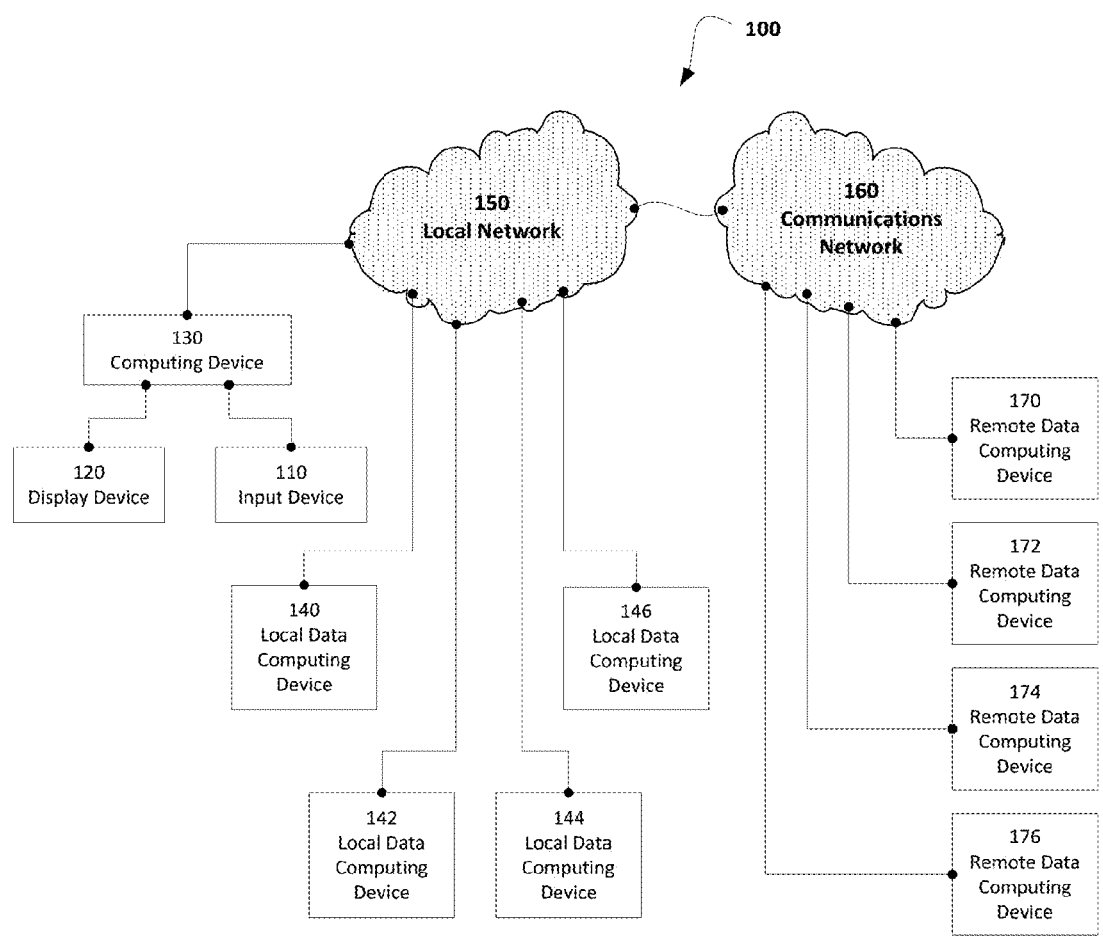
FIG. 1 is a schematic diagram representation of a system 100 for securely transmitting and storing information in a communication network according to a disclosed embodiment.

In general, this disclosure is directed to systems and methods for securely obfuscating, transmitting, storing, and increasing the transmission rates of digital information. Digital information may include information transmitted across any communication network. Communication networks may include, for example, data networks such as a LAN (Local Area Network), MAN (Metropolitan Area Network), WAN (Wide Area Network), PAN (Personal Area Network), cellular networks, power line networks; satellite link networks, or any combination thereof. Furthermore, the transmission medium for such networks may be wired or wireless. The information itself may represent voice information, data information, multimedia information, or any other such information capable of being transmitted across a communication network. As discussed below, the present disclosure may be implemented as a software program running on a processor, a hardware device, or any combination thereof.

At a high level, this disclosure is directed to at least one software program running on one or more computing devices. The software program implements an algorithm that provides an end-to-end information storage and transmission solution that acts upon digital information by parsing the information into a plurality of datasets, optionally compressing the datasets, and rendering the datasets indecipherable to unauthorized use. In addition, the program may separate the datasets into data blocks that are dispersed in a deterministic or nondeterministic manner to produce one or more modified data streams or datasets. These datasets are stored in a plurality of local and/or remote locations on volatile or nonvolatile storage media, or transmitted over a wired or wireless network. The one or more modified data streams or datasets are always maintained in a dispersed and highly compressed state which is indecipherable to unauthorized use.

The terms "parse" or "parsing" as used herein refer to a formal analysis of data by computer to divide a string, byte array, data stream, or the like, into elemental constituents of the data.

The term "deterministic" as used herein refers to systematically predetermine the characteristics for disassembling and/or dispersing data. For instance, information may be disassembled into bits, nibbles, bytes, or larger size data blocks depending upon the data type such as, for example, ASCII text or a video stream, or device control information, or a program or program segment such as a code block. The disassembly may also be performed to enhance compression techniques or to enhance encryptions techniques, and the like, as described elsewhere in this disclosure. Alternatively, information may be dissembled and dispersed in such a manner as to enhance network transmission modalities, transmission rates, or to accommodate different storage conditions. For example, data may be stored in a SAN (Storage Attached Networks) or NAS (Network Attached Storage) configuration as opposed to being stored in stand-alone devices such as smart phones. In another embodiment, information may be dissembled and dispersed in a manner so as to overcome technical difficulties or various constraints such as, for example, those which attenuate electrical interference in broadband over powerline networks or atmospheric disturbances in wireless networks, or those affecting military and police ad hoc radio and other such data transmissions where not all communications devices are expected to be online at the same time. In alternative embodiments, other such contingencies may arise from time to time which may require the deterministic dispersal of data blocks.

The term "non-deterministic" as used herein refers to a procedure for disassembling and/or dispersing data as bits, bytes, nibbles, or data blocks of various sizes in a pseudo-random manner such as, for example, by generating a random number and associating the disassembled data with the alphanumeric sequence of the random number. Nondeterministic disassembly and dispersion may also be deterministically applied as a natural result of some mechanism or algorithm which may accomplish the tasks of disassembly and/or dispersion of data without the use of a random number. While the decision to use a process or procedure may be truly non-deterministic (random), all operations that modify the original data by a process or procedure may be deterministic in nature for the structural integrity of the original data to be preserved when those processes are reversed.

The term "blocks" as used herein refers to groups of bits, nibbles, and/or bytes which can be of uniform size such as, for example, 16 bytes each, or they can be of non-uniform size.

Because the information processed by the disclosed techniques may be maintained in a compressed state, this compressed information can be bi-directionally transmitted at data transmission rates that are substantially greater than the maximum data transmission rate that is normally predicted by theorems, such as, for example, the Shannon Hartley theorem, for a given network or network segment while always remaining indecipherable to unauthorized use.

Because the information processed by the disclosed techniques may be dispersed into smaller information subsets, these subsets can be bi-directionally transmitted over a plurality of network paths in a simultaneous or near simultaneous manner at data transmission rates that are substantially greater than the maximum data transmission rate that is normally predicted by theorems, such as, for example, the Shannon Hartley theorem, for a given network or network segment while always remaining indecipherable to unauthorized use.

The disclosure may be implemented in software running on a processor, other hardware or both. In an embodiment, the implementation may include software embodying an algorithm consistent with the present disclosure. Furthermore, the algorithm may be configured to function on all types of wired networks using different transmission media such as, for example, coaxial cable, fiber optic cable, powerlines, and all types of wireless networks operating at different frequencies based on the type of transmission standards used. In addition to being transmission medium agnostic as discussed above, the algorithm is also communication protocol agnostic, meaning that it can be implemented on a communication network using any communication protocol or standard such as, for example, IP, Decnet, AppleTalk, Ethernet on a data network, GSM or CDMA on a cellular network, or any other such protocol or standard.

FIG. 1 provides a schematic representation of a system 100 for securely transmitting and storing information according a disclosed embodiment. System 100 includes an input device 110, a display device 120, a computing device 130, local data computing devices 140, 142, 144, and 146, a local network 150, a communication network 160, and remote data computing devices 172, 174, 176, and 178.

Generally, computing device 130 is configured to receive data from input device 110 or from local network 150. This data may be received in the form of one or more bit streams. Computing device 130 may also be configured to parse the received data into one or more first datasets and compress the one or more first datasets to form one or more second datasets. In addition, computing device 130 may also encrypt the one or more second datasets to form one or more third datasets. Furthermore, computing device 130 may also assemble the one or more third datasets to form at least one second bit stream. This second bit stream may be output to one or more of local computing devices 140, 142, 144, and 146 and/or one or more of remote computing devices 172, 174, 176, and 178 via local network 150 and/or communication network 160. In addition, or alternatively, computing device 110 may disassemble the one or more third datasets into multiple data blocks so as to form "t" volumes. In particular, one or more blocks may be part of a volume.

Furthermore, the formation of "t" volumes occurs in such a manner that "m" out of "t" volumes contain a complete data set, wherein "m"<"t." Computing device 110 may also be configured to disperse the "t" volumes through local network 150 and/or communication network 160 such that the "t" volumes are stored over any combination of local computing devices 140, 142, 144, and 146 and/or one or more of remote computing devices 172, 174, 176, and 178, the end result being that no single computing device stores a complete dataset. The terms "t" and "m" are used to merely describe a feature of the disclosure and should not be considered limiting in any manner.

Input device 110 may be any device that allows a user to input data into computing device 130. This may include, for example, a workstation keyboard, a laptop keyboard, a keyboard for a smart phone, a mouse, or software that recognizes voice commands and converts the commands into a format readable by computing device 130. Display 120 may include, for example, a workstation monitor, a laptop monitor, or a monitor physically integrated with a key board such as, for example, that of a smart phone or a laptop. Input device 110 may be connected to display device 130 in multiple ways. For example, in an embodiment such as a workstation input device 110 may communicate via computing device 130 through a wired or wireless connection. On the other hand, input device 110, display device 120, and computing device 130 may be physically integrated onto one chassis to form a laptop, a smart phone or any other such device.

Computing device 130 may include any device that processes data and stores and/or transmits the data. For example, computing device may include a workstation, a laptop, a server, a smart phone, or any other such device that can execute a software program that processes, stores, and/or transmits information according to disclosed embodiments. Computing device 130 may include a port to receive data for processing from input device 110 and a port to receive data for processing from local network 150. These ports may be a USB port, a cat5 port, a coaxial port, a fiber port, or any other such port capable of receiving digital data.

Computing device 130 may connect to one or more local computing devices 140, 142, 144, and 146 via a local network 150. Local computing devices 140, 142, 144, and 146 may be similar to computing device 130 in that they have the ability to process and store/and transmit data. At minimum, local computing devices 140, 142, 144, and 146 are configurable to securely store data. Local network 150 may be a wired or wireless local area network ("LAN") that includes network devices such as, for example, hubs, switches, routers, and other equipment that may be used to operate a LAN. In an embodiment, local network may be a home network, an office network, or a home office network or any other network that would connects computing devices locally.

Furthermore, the physical medium transmitting information through local network 150 may be fiber optic cables, coaxial cables, cat5/6 cables, powerlines using broadband over power line technology, or any other wired medium capable of transmitting data. In an alternative embodiment, local network 150 may be a wireless data network or a cellular network that is capable of transmitting data. While local network 150 may be a local area network, one of skill in the art will appreciate that in an alternative embodiment, local network 150 may also be a Metropolitan Area Network ("MAN") and would also be consistent with the scope of this disclosure.

Remote computing devices 172, 174, 176, and 178 may be similar to computing device 130, and local computing devices 140, 142, 144, and 146, in that they also have the ability to store and transmit data, and, at a minimum are configurable to securely store data. Each computing device discussed above may include a central processing unit ("CPU") (not shown), Random Access Memory ("RAM") (not shown), Read Only Memory ("ROM") (not shown), non-volatile memory (not shown), and volatile memory (not shown). Furthermore; each of these components may be mounted on the same physical chassis or distributed across multiple chassis without departing from the scope of this disclosure.

Local network 150 may connect to communication network 160 through a wired or wireless connection. In an embodiment, communication network 160 may be the Internet or any other wide area network such as, for example, a private intranet such as one owned by the Defense Information Systems Agency ("DISA"), the US Navy's WAN called Smartlink, or any other such network.

In an embodiment, computing device 130 may include a controller configurable to perform data compression, encryption; and dispersion. The controller may include components necessary to perform the abovementioned features. These may include, for example, at least a portion of a control processing unit configured to execute software instructions that may perform these features, at least a portion of one or more memory units that store these software instructions, and any other components necessary to perform the abovementioned features. While the disclosed embodiment discusses the features of data compression, encryption, and dispersion being accomplished in software running on a processor alone, one skilled in the art will appreciate that in an alternative embodiment, the abovementioned features may be accomplished in hardware only by use of specialized hardware such as one or more Application Specific Integrated Circuits (ASICs), or off-the-shelf hardware without departing from the scope of this disclosure. In yet another embodiment, the abovementioned features may be performed by a combination of hardware and software.

In an embodiment, a controller on computing device 130 is configured to receive data from input device 110. This data may be in the form of one or more digital files or bit streams. The controller may also be configured to buffer the received data. In addition, the controller may also be configured to parse the one or more received and buffered files or bit streams into one or more first datasets. In an embodiment, the portion of the controller that performs this parsing function may be a parsing module which, as discussed above, may be software instructions that perform the parsing, one or more hardware components that perform the parsing, or a combination of both. A dataset, as used in this disclosure, may be of fixed size, i.e., include a fixed number of bits, or may be of variable size, i.e., include a variable number of bits up to a maximum number of bits. In an embodiment, the parsing module may be a software component running on a processor, a hardware component, or any combination thereof, that receives digital information as a bit stream if data is in motion or alternatively convert digital information into a bit stream if data is at rest. The type of parsing done by the parsing module may depend on the downstream processing of the digital information contemplated by computing device 130. For example, the parsing may be done differently for data that needs to be dispersed as opposed to data that does not need to be dispersed. Alternatively, data that will be dispersed deterministically may be parsed differently than data that will be dispersed non-deterministically. In an embodiment, the bit stream may be separated according to a mathematical formula into bits, nibbles, bytes or blocks of bytes of uniform or varying sizes. These resulting parsed datasets may be used as building blocks by various information dispersal algorithms such as Michael O'Rabin's algorithmic implementation of Adi Shamir's Secret Sharing Scheme. In addition, after the bit stream is parsed into one or more first datasets, these datasets may be written to a memory buffer or if necessary to a disk swap file if virtual memory is activated.

In addition to parsing, the controller in computing device 130 may also overwrite one or more memory locations holding the one or more original bit streams with a random or non-random data pattern. This overwriting may be done to ensure that no one has access to the original bit stream, thereby enhancing the security of data in system 100. In an embodiment, after the parsing module processes the bit stream into one or more first datasets, a complimentary method running in a separate thread may overwrite any file space occupied by the bit stream using a scrub algorithm that repeatedly writes a random or non-random data pattern to each memory location to deep clean the memory space or swap file space occupied by the bit stream.

The controller in computing device 130 may also be configured to compress the one or more first datasets to form one or more second datasets. In an embodiment, the portion of the controller that performs this compression function may be a compressing module which, as discussed above, may be software instructions that perform the compressing, one or more hardware components that perform the compressing, or a combination of both. In an embodiment, the compressing module may be a software component running on a processor, a hardware component, or any combination thereof, including a pool of data compression utilities. The compressing module may select algorithms or various features contained within a single algorithm to accommodate an individual data need. Some of the compressing algorithms that may be used by the compressing module include LZ77, PAQ8PX, LZMA, Gzip, or the like. Furthermore, different compressing algorithms may be selected for providing the compression feature for different types of data. For example, if the data to be processed is in the form of text and/or PDF files, the compressing module may select the LZ77 algorithm for compressing such data. On the other hand, the compressing module may select the PAQ8PX algorithm for compressing data in the form of word documents, excel files, or bitmap files. In addition, the LZMA(l) algorithm may be selected to compress data in the form of image files or xis files.

In an embodiment, where information is being processed as a file, the selection may be accomplished by extracting the file type from the filename, or by opening the file and extracting the metadata in the file header that describes the type of data included in the file. The compressing module may then apply the appropriate algorithm known to have utility for compressing such data. The controller in computing device 130 may also determine from extracting the file type or header metadata that the file has already been compressed, or is not deemed compressible and, therefore, may skip the compression step.

In an embodiment, if the parsed dataset is small enough, the parsed dataset may be compressed as a single dataset. Alternatively; if the parsed datasets are larger, then the parsed dataset may be separated into smaller data subsets which may be compressed individually.

The controller in computing device 130 may also be configured to cryptographically modify the one or more second datasets to form one or more third datasets. In an embodiment, the portion of the controller that performs this encryption function may be an encryption module which, as discussed above, may be software instructions that cause a processor to perform the encryption, one or more hardware components that perform the encryption, or a combination of both. In an embodiment, the encryption module may encrypt data using any one, or a combination, of known encryption algorithms such as, for example, AES-256, 3DES, or Two Fish. Furthermore, data may be encrypted more than once using different encryption algorithms each time. For example, data may first be encrypted with AES-256 and then re-encrypted with 3DES, or any other encryption algorithm. Each of the encryption algorithms used by the encryption module may modify the one or more datasets in such a manner as to render the information included in the datasets indecipherable to unauthorized use. One of skill in the art will appreciate that in an embodiment, the parsing, compression, encryption, and dispersion modules may be part of one single algorithm incorporating all these functionalities.

In addition, in an embodiment consistent with the present disclosure, the controller in computing device 130 may assemble the one or more third datasets to form at least one second bit stream. This second bit stream contains information that in essence is identical to that of the original first bit stream received from input device 110, but which has now been parsed, compressed, and encrypted, thereby rendering it indecipherable to unauthorized use. The controller in computing device 130 may be configured to output this second bit stream to any combination of local devices 140, 142, 144, and 146 and remote computing devices 172, 174, 176, and 178 via local network 150 and/or communication network 160.

The transport mechanism used by computing device 130 to output the second bit stream may depend on the type of connectivity between computing device 130 and the local devices 140, 142, 144, and 146 and remote computing devices 172, 174, 176, and 178. For example, in an embodiment, if computing device 130 connects to local computing devices 140, 142, 144, and 146 via local network 150 which is an Ethernet network, then computing device 130 may output the second bit stream as Ethernet frames at the datalink layer. In addition, if in an embodiment computing device 130 connects to remote computing devices 172, 174, 176, and 178 via communication network 160 in addition to local network 150, where communication network 160 is a TCP/IP network, then computing device 130 may output the second bit stream as TCP/IP frames at the network and transport layer. Furthermore, local computing devices 140, 142, 144, and 146 and/or remote computing devices 172, 174, 176, and 178 may store the second bit stream in any memory unit configurable to hold such data. Furthermore, computing device 130, local computing devices 140, 142, 144, and remote computing devices 172, 174, 176, and 178 may each include a networking component (not shown) that connects the computing device to local network 150 or communication network 160 such as, for example, an Ethernet card.

In an alternative embodiment, the controller in computing device 130 may disassemble the one or more third datasets into multiple data blocks so as to form "t" volumes or "t" data streams as part of at least one second bit stream. In particular, one or more blocks may be part of a volume. Similar to datasets, a data block may be of a fixed size, i.e., hold a fixed number of bits or of variable size and, as such, can be configured in any manner suitable to one of skill in the art without departing from the scope of this disclosure. A volume may also be configured to hold one or more data blocks and, as such, its size is also configurable by one of skill in the art without departing from the scope of this disclosure. In addition, the formation of "t" volumes occurs in such a manner that "m" out of "t" volumes contain a complete dataset, wherein "m"<"t." The values of "t" and "m" are selectable by a user of the techniques consistent with the present disclosure.

Thus, for example, a user may decide to use techniques consistent with the present disclosure to modify an original bit stream into at least one second bit stream that has 8 volumes such that 2 out of those 8 volumes contain a complete dataset. On the other hand, a user may decide to use techniques consistent with the present disclosure to modify an original bit stream into at least one second bit stream that has 4 volumes such that 2 out of those 4 volumes contain a complete dataset.

In addition, the controller in computing device 130 may also be configured to disperse the "t" volumes through local network 150 and/or communication network 160 such that the "t" volumes are stored over any combination of local computing devices 140, 142, 144, and 146 and/or one or more of remote computing devices 172, 174, 176, and 178, the end result being that no single computing device stores a complete dataset. Thus, for example, if a user decides to modify an original bit stream into at least one second bit stream that has 8 volumes ("t"=8) such that 2 out of those 8 volumes contain a complete dataset ("m"=2), then the 8 volumes may be distributed across the local computing devices 140, 142, 144, and 146 and the remote computing devices 172, 174, 176, and 178 in a random or pseudorandom manner. Furthermore, in system 100, because t=8 and m=2, any 6 volumes (which may also be considered as 6 second data streams) can be destroyed and the two remaining volumes (or two remaining data streams) would contain a complete dataset. The six remaining volumes can subsequently be reconstructed at alternate locations without any loss of information integrity. This further increases information security because no complete dataset is ever stored in a single computing device. Data transmitted and stored in such a manner may persist in a state of high availability across a network of any size. As discussed above, the numbers 8 and 2, as used above are for example purposes only and do not limit the scope of the present disclosure.

In an embodiment, the feature of disassembling the third datasets into multiple data blocks and dispersing the data blocks in the manner described above may be performed by a dispersing module in computing device 130. The dispersing module may be a software component running on a processor, a hardware component, or any combination thereof in computing device 130. In an embodiment, the dispersing module may use an information dispersal algorithm according to a known process such as, for example, Adi Shamir's Secret Sharing Scheme.

One skilled in the art will appreciate that the number of local and remote computing devices used as storage locations depicted in FIG. 1 is for illustrative purposes only. That is, any number of computing devices used as storage locations may be present in a system utilizing techniques consistent with the present disclosure, and the locations of where volumes are sent may change constantly. For example, if there are 1000 computing devices located in, for example, federal post offices, configurable to store 8 "t" volumes, whereby m=4 of the 8 volumes hold a complete dataset created by computing device 130, then the controller may choose any 8 out of the 1000 computing devices to store the 8 volumes in a random or pseudorandom manner such that no one, not even an authorized user of system 100, may know which of the 1000 computing devices store the 8 volumes.

Moreover, in an embodiment, every time a user saves a dataset, such as after editing it, a computing device may randomize the assignment of storage locations so that in all probability no individual volume is ever returned to the same storage location from where the dataset was taken. In addition, the computing device may, before saving, reassign a dataset a new filename derived by randomly generating alphanumeric strings that are lengthy and unique to each of the 8 volumes every time a dataset is saved, further obfuscating the ability of an adversary to locate the "m" volumes needed to even have the possibility of reassembling a dataset. Also, one or more computing devices may be programmed to relocate and/or rename the 8 volumes along with all of the other volumes, in a globally dispersed storage network of volumes, at intervals which may be randomly or deterministically determined Thus, the disclosed techniques may increase data security by continually performing a data shell game with respect to the placement of data over time in an ever changing number of storage devices.

The term "data shell game" as used herein refers to a set of techniques consistent with the present disclosure which may create a system for securing information such as, for example, a dataset, in a communication network by: using an information dispersal algorithm to disperse the dataset into t subsets of the dataset; transmitting and storing the t subsets in t separate locations, in such a manner the m number of subsets needed to reassemble the dataset never travels over a single transmission path or is stored in a single storage location; obfuscating the descriptive references regarding the subsets such as, for example, storage location references, local and remote path references, filenames, file sizes, file metadata (date and time the file was created, accessed or modified), making it a near-impossibility for an unauthorized user to locate m subsets stored in m separate locations, out of a multitude of potential storage locations, and identify which subsets can be used to reassemble a complete dataset, out of a multitude of potential subsets that reside in the multitude of potential storage locations, since there are no reliable descriptive references by which an unauthorized user can sort the m subset from the multitude of potential subsets residing in the multitude of potential storage locations and; to obfuscate the actual locations where potentially discernible data may be stored by confining all user interactions with potentially discernible data to the user space 909 of operating system memory and all potentially discernible data to the kernel space 610 of operating system memory; all of which comprise a data shell game of monumental proportion.

For example, computing device 130 may disperse the 8 "t" volumes such that none of the 8 volumes ever reside on computing device 130. Furthermore, even after the 8 volumes are stored on 8 out of the 1000 computing devices, the computing devices may be configured to relocate the 8 volumes amongst other of the 1000 computing devices that were previously not storing any of the 8 volumes. The intervals at which this relocation may occur may be determined pseudo randomly by generating a random number and associating the time interval with the alphanumeric sequence of the random number. Alternatively, the intervals for this relocation may be determined according to characteristics pertaining to the data underlying the t volumes. For example, if metadata accompanying the underlying data reveals that the underlying data is extremely confidential, then the interval for this relocation may be set shorter than that of data that is not as confidential. Thus, the confidentiality level of the underlying data may affect the frequency of relocation of the t volumes.

In an alternative embodiment consistent with the present disclosure, the controller in computing device 130 may be configured to select the distributed data storage locations according to a number of factors. These may include, for example, storage space allocation considerations, traffic flow considerations, network congestion considerations, network routing considerations, file characteristics considerations, packet type considerations, communication protocol considerations, or any combination thereof. For example, the controller in computing device 130 may choose not to store data that is processed in accordance with the present disclosure on remote computing device 174. This may be because the controller may determine that remote computing device does not have sufficient storage capacity or that the network path between local computing device 130 and remote computing device 174 is congested. Alternatively, remote computing device 174 may not be able process data packets of the type generated by computing device 130 and, therefore, may be unable to store data processed by the controller on computing device 130. In yet another embodiment, remote computing device 174 may be unable to communicate with computing device 130 because of a communication protocol mismatch. For example, computing device 130 may be configured to transmit data using TCP/IP but remote computing device 174 may be only configured to receive AppleTalk packets. Alternatively, computing device 130 may be configured to communicate via an Ethernet network but remote computing device may be configured for Token Ring only and there may be no protocol conversion device in between. Under such conditions, remote computing device 174 may be unable to store data processed by computing device 130 in accordance with the present disclosure. Therefore, the controller in computing device 130 may choose not to include remote computing device 174 as a recipient of the processed data. Instead, the controller can store the data to volume 176 or such other device as may then be compatible and available.

In an alternative embodiment consistent with the present disclosure, the controller in computing device 130 may be configured to obfuscate the stored data file's metadata for the purpose of increasing the strength of security imposed by the data shell game. For example, the date and/or time a stored data file was created, and/or modified, and/or accessed may all be set to random dates and times, or the stored data file may be set to a single date, such as Jul. 4, 1776, or any combination thereof.

One of skill in the art will appreciate that computing device 130 may include a component other than a controller that may perform the abovementioned features. That is, any hardware component, software component running on a processor, or any combination thereof, that may cause computing device 130 to provide the features discussed herein may be used without departing from the scope of this disclosure.

Furthermore, in an alternative embodiment, computing device 130 may first disassemble the one or more third datasets into multiple data blocks so as to form "t" volumes or "t" data streams and then cryptographically modify the t volumes or t data streams. As discussed above, the encryption may be performed using an encryption module. Furthermore, additional security may be provided by encrypting each volume or data stream with a different key. In yet another embodiment, each volume or data stream may be encrypted using a different algorithm that may be randomly or deterministically selected from a pool of potential encryption algorithms. Deterministic selection may be used as the result of constraints imposed by owners of data whereby the owner may want only a small group of algorithms used, such as AES-256 (the NIST standard for government use) or Serpent or Two Fish. Some other data owners may want to use only proprietary encryption algorithms such as RSA or PSquared, while still others may want to use only Open Source algorithms since they are royalty free. The individually encrypted volumes may then be transmitted over multiple network nodes or stored in multiple local and globally distributed locations.

In an alternative embodiment, the disclosed techniques may further accelerate data transmission rates by employing multiple channels, frequencies, or sub-frequencies for wireless transmissions, and/or via multiple medium voltage powerlines for broadband over powerline transmissions, and/or over multiple network nodes through local network 150 and/or communication network 160 so as to transmit the dispersed data in parallel over multiple conduits, channels, frequencies, or sub-frequencies in a deterministic or nondeterministic manner. As discussed above, local network 150 and communication network 160 may be wired or wireless networks. In an embodiment, where information is transmitted across power line networks, signal stabilizing software/equipment may be used to increase the number of clean frequencies that may be employed. If these networks are wireless networks they may include wireless network nodes such as, for example, wireless access points or wireless routers. Similarly, if these networks are wired networks they may also include wired network nodes such as, for example, a telecom hub that provides for the co-location of internetworking equipment of various Internet Service Providers (ISPs).

In an embodiment, communication network 160 may include a fiber optic network. In this case, the controller in computing device 130 may be configured to disperse the "t" volumes created from the original stream by dispersing the "t" volumes over multiple lambdas in a single strand of fiber, over multiple strands of fiber, or by both methods. Transmitting dispersed data volumes as described above in a fiber optic cable may be done in a deterministic or nondeterministic manner according to disclosed embodiments which may lead to increased aggregate data transmission rates.

In another embodiment, communication network 160 may be a wireless network. This may include, for example, a cellular network, a satellite network, a wireless data network such as a Wi-Fi, WiMax, or microwave network, or any combination thereof. In this case, the controller in computing device 130 may be configured to disperse the "t" volumes created from the original stream across a plurality of frequencies serviceable in at least one radio contained in a wireless or powerline access point, or by means of multiple radios tuned to different channels or frequencies. Transmitting dispersed data volumes as described above through a wireless network may be done in a deterministic or nondeterministic manner according to disclosed embodiments which may lead to increased aggregate data transmission rates. By practicing this technique of the present disclosure, data transmission rates may be increased by transmitting data using parallel transmission techniques instead of the serial transmission techniques employed according to conventional wisdom.

In yet another embodiment consistent with the present disclosure, local network 150 and/or communication network 160 may be electric powerlines equipped with Broadband over Powerline ("BPL") equipment. Such a network may also include BPL access points. In this case, the controller in computing device 130 may be configured to disperse the "t" volumes created from the original stream by dispersing the "t" volumes over multiple channels (frequencies) in an individual power line, over one channel in each of multiple powerlines, or by both. This may be achieved by multiplexing the signal for a single broadband over powerline cross-conversion card and sending the multiplexed signal or by using a plurality of cross-conversion cards, each of which may transmit unitary or multiplexed signals. Moreover, transmissions from/to multiple cross-conversion cards can contain a single data transmission in a single cross-conversion card or dispersed information may be transmitted by dispersing an admixture of sub-volume-containing packets through the total number of channels and cross conversion-cards then available. Transmitting dispersed data volumes as described above in electric powerlines may be done in a deterministic or nondeterministic manner according to disclosed embodiments which may lead to increased aggregate data transmission rates.

The term "OFDM" as used herein refers to orthogonal frequency division modulation, which is a method of encoding digital information on multiple carrier frequencies. OFDM is a popular scheme for facilitating wireless and/or wired digital communication in applications such as, for example, digital television and audio broadcasting, DSL Internet access, wireless networks, powerline networks, and 4G LTE mobile communications.

In an alternative embodiment, local network 150 and communication network 160 may include a combination of BPL and wireless technologies. By integrating software and/or hardware consistent with the present disclosure into the firmware of BPL cross-conversion equipment or wireless access equipment, data passing through this equipment may become indecipherable to unauthorized use while data transmission rates may be substantially increased. Such networks may further protect users from fraud and identity theft, and in addition connect more efficiently with a cloud computing environment.

Furthermore, wireless access equipment processing data in accordance with the present disclosure may include at least one circuit board comprising at least a chipset. This chipset may be capable of cross-converting data between BPL and wireless modulations by varying one or more properties of the carrier signal with respect to the modulating signal. In addition, the wireless access equipment may also include an operating system software or firmware for cross-conversion of data comprising one or more of the following: a chipset master control software which includes methods for transmitting and receiving digital information; an OFDM to Ethernet data conversion algorithm; an Ethernet to OFDM data conversion algorithm; a cipher encryption algorithm; a cipher decryption algorithm; a data dispersing algorithm; a data reassembly algorithm; an encoding or compression algorithm; and decoding or decompression algorithm. The wireless equipment may also include RAM or flash memory, an interface for communicating with wired and wireless networks, and an interface for communicating with a BPL network.

Each BPL device performing data processing in accordance with the present disclosure may provide a variety of features. These functions may include, for example, providing a user with a high resolution, high fidelity audio and/or video presentation system; managing the digital rights of content owners which may include providing security for data encryption/decryption schemes, content usage tracking, various auditing and reporting functions, and the like; tracking a user's movements and responses within his/her operating environment for the purpose of developing, refining and maintaining a psychographic profile of the user; and facilitating the transaction of banking; ecommerce, and other financial activities.

For the most part, BPL devices may not need extra hardware or hardware upgrades if the present system was embedded in software agents that run in server-based data processing systems and user data processing systems. However, if a processor in the BPL chipset cannot handle the additional load resulting from data processing consistent with the present disclosure, it may be advisable to redesign the cross-conversion cards and add additional arithmetic processor circuitry to the ASIC or add a SOC (system-on-a-chip), such as the Intel® EP80579 Integrated Processor. The addition of a SOC may increase device headroom. This may also be needed to provision mobile network objects with enough intelligence to operate efficiently on the system. Moreover, adding an embedded system on a separate card connected to the BPL buss, or SOC to cross-conversion cards may provide additional headroom for military and other high efficiency applications.

In some embodiments consistent with the present disclosure, BPL and Wireless equipment may be controlled with ASICs such as, for example, OFDM ASICs. In many cases, the existing ASIC may be powerful enough to process data in a manner consistent with the present disclosure. However, in some cases, hardware in BPL and Wireless equipment may require additional resources for the disclosed data processing, such as, for example, flash memory, ASIC enhancements, an additional ASIC, or the addition of more circuits or circuit boards to accommodate the functionality of an embedded system, system on a chip (SOC), or other hardware-dependent or software-dependent functionality.

As discussed above, the aggregate effective data rates through communication network 160 may be increased by transmitting data along multiple parallel transmission routes, irrespective of the medium of transmission by using techniques consistent with the present disclosure. In addition, the present system may also increase data security. Specifically, data that is compressed and/or rendered indecipherable to unauthorized use according to the disclosed techniques may be separated deterministically or non-deterministically, dispersed, and transmitted across multiple data paths to and from multiple storage devices which can be locally present or geographically distributed. This may have the effect of further increasing data security since no complete dataset, or forensically discernible data, would ever be sent across a single network path or stored on a single storage device. In most cases, this may be naturally achieved as a result of datasets being dispersed according to the practice of the present disclosure, being disassembled, and separated into multiple volumes which are sent to a plurality of geographically distributed storage locations. The diversity of geographically separated storage locations may assure the likelihood that most volumes will be transmitted over different network nodes, especially over a global WAN that is populated by a large number of potential storage locations. These locations may include, for example, banking institutions, post offices, government installations, military facilities, hospitals, clinics, and medical centers. Practicing the data shell game may make data nearly as secure when stored in, for example, a New York City street corner news booth as it is in a high security datacenter.

In an alternative embodiment, techniques consistent with the present disclosure may be used in a cloud computing environment. Cloud computing is a style of computing in which dynamically scalable and often virtualized resources are provided as a service over the Internet. Users need not have knowledge of, expertise in, or control over the technology infrastructure of the "cloud" that supports them. The concept incorporates infrastructure as a service (IaaS), platform as a service (PaaS), and software as a service (SaaS), as well as other recent (ca. 2007-2013) technology trends that have the common theme of reliance on the Internet for satisfying the computing needs of the users. Cloud computing services may provide business applications online that are accessed from a web browser, while software and data are stored on cloud servers. In an embodiment consistent with the present disclosure, the term cloud may be used as a metaphor for the Internet, based on how the Internet is depicted in computer network diagrams, and is an abstraction for the complex infrastructure it conceals.

Typically, users of a cloud computing system may be globally distributed and do not use conventional workstations and laptops because most of the data processing functions that the users need are provided by systems in the cloud. To this end, a remote user's data processing system can be any device that links to the cloud computing system in such a manner as to facilitate data processing functions between the remote user's data processing system and the cloud system's data processing system. By practicing techniques consistent with the present disclosure, the rate of transmission of data between users and the cloud can be increased. This is at least because of the ability to transmit data in a compressed state and/or disperse the data over multiple physical media and/or multiple frequencies as discussed above. In addition, the information dispersion, encryption, and obfuscation techniques consistent with the present disclosure may ensure that information stored on a user's data processing system and the cloud data processing system is at all times held in a state that is indecipherable to unauthorized use.

In an example embodiment, the cloud computing network which facilitates reliable cloud computing services may be populated by a plurality of "cloud computing service zones." Cloud computing service zones may collectively provide a virtual computing environment including a ubiquitous dispersion of wired and wireless network information which is redundantly allocated within the cloud computing service zones. To increase security, no single cloud computing service zone may contain a complete dataset of any information file. Instead, the data that comprises a dataset would be dispersed in a deterministic or nondeterministic manner over the plurality of cloud computing service zones in a manner consistent with the present disclosure.

The term "global cloud" as used herein refers to a variety of computing concepts that involve a plurality of computers connected through a real-time communication network such as, for example, the WAN or Internet.

Figure 2:
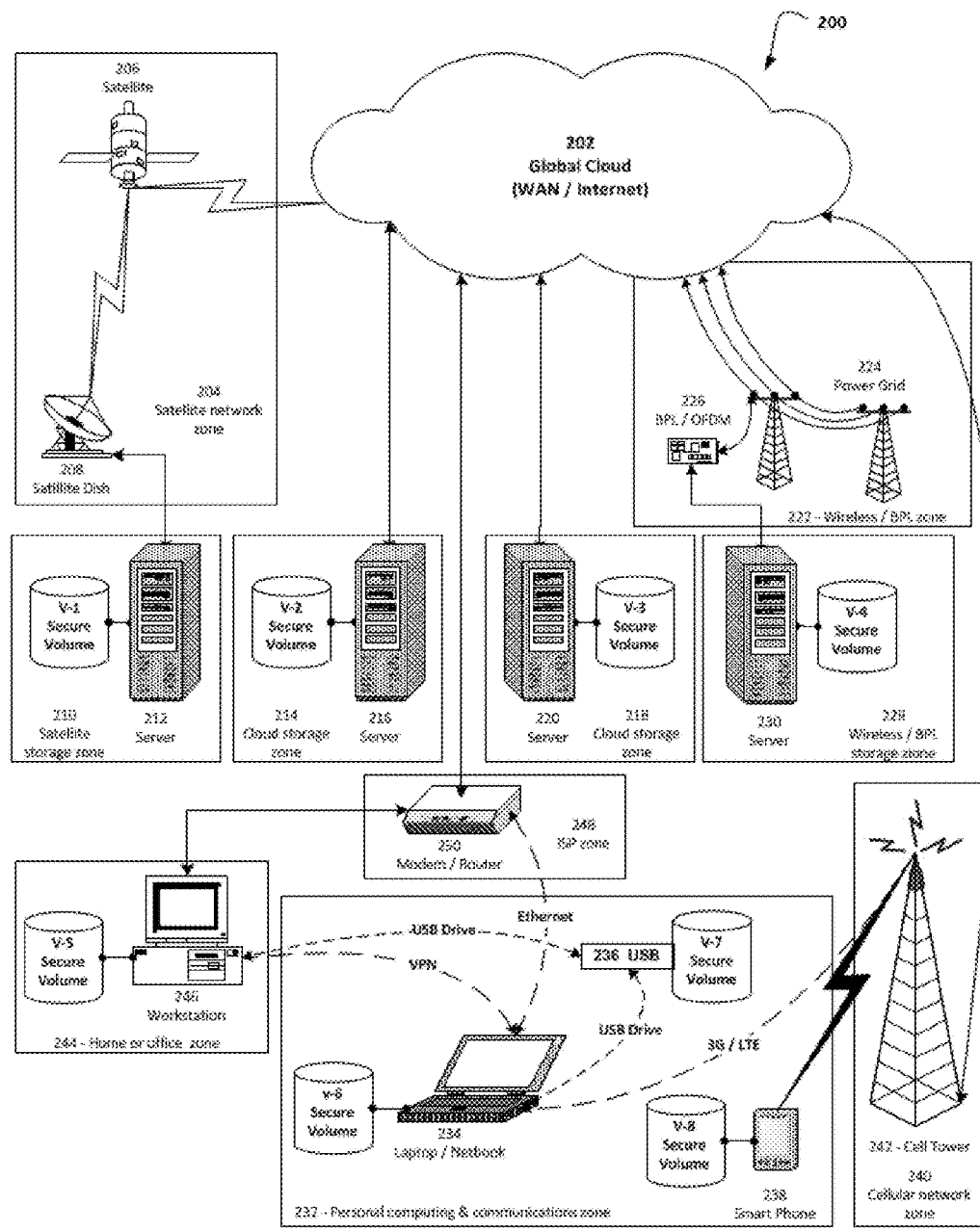
FIG. 2 is a schematic representation of cloud computing system 200 for securely transmitting and storing information in a communication network according a disclosed embodiment.

FIG. 2 provides a schematic representation of a cloud computing system 200 for securely transmitting and storing information according a disclosed embodiment. System 200 includes a global cloud 202, a satellite network zone 204, a satellite 206, a satellite dish 208, a satellite storage zone 210, a server 212, a first storage zone 214, server 216, a second storage zone 218, server 220, a wireless/BPL network zone 222, server 230, wireless/BPL zone 222, a power grid 224, a BPL/OFDM access point 226, a wireless/BPL storage zone 228, server 230, a personal computing and communications zone 232, a laptop/netbook 234, a USB drive 236, a smart phone 238, a cellular network zone 240, a cell tower 242, a home or office zone 244, a workstation 246, an ISP zone 248, and modem/router 250.

In an embodiment, system 200 may be divided into several cloud computing service zones that directly or indirectly connect with global cloud 202. These cloud computing service zones are used for communication and/or data storage purposes. For example, satellite network zone 204 may connect satellite storage zone 210 to global cloud 202. To this end, satellite network zone 204 may include a satellite 206 and a satellite dish 208. Satellite dish 208 may transmit and receive data to/from server 212 located in satellite storage zone 210. In addition, satellite 206 may bi-directionally transfer this satellite storage zone data to/from global cloud 202. Server 212 may include software running on a processor, other hardware, or any combination thereof capable of practicing the data compression, encryption, and dispersion techniques consistent with the present disclosure. In particular, server 212 may include a secure storage volume V-1 capable of storing data processed according to techniques consistent with the present disclosure.

System 200 may also include a first storage zone 214. First storage zone 214 may connect to global cloud 202 via a physical medium such as, for example, one or more fiber optic cables. First storage zone 214 may also include server 2 16 which may be similar to server 212 in that it may capable of practicing the data compressing, encryption, and dispersion techniques consistent with the present disclosure. In particular, server 216 may include a secure storage volume V-2 capable of storing data processed according to techniques consistent with the present disclosure. System 200 may similarly include second storage zone 220 which includes a server 218. Server 218 may include secure storage volume V-3 which is similar to storage volumes V-1 and V-2.

System 200 also includes a Wireless/BPL zone 222 which bi-directionally transfers data to global cloud 202 via one or more power grids 224. To this end, each power grid 224 may include one or more BPL/OFDM access points 226. The specifics of these access points have been discussed above and, therefore, will not be repeated for purposed of brevity. Wireless/BPL storage zone 228 may connect to Wireless/BPL zone 222 via cables such as, for example, fiber optic cables that may further connect to a hybrid multi-technology network comprised of, for example, fiber, broadband over powerline, wireless, and coaxial technologies. Wireless/BPL storage zone 228 may include server 230 which, similar to servers 212, 216, and 220, may include secure storage volume V-4.

One of skill in the art will appreciate that while system 200 depicts a single server in each storage zone, the disclosure is not limited thereto. Rather, each storage zone 210, 214, 218, and 228 may include multiple servers or other storage devices that may store and process data using techniques consistent with the present disclosure without departing from its scope. Moreover, each service zone depicted symbolizes a plurality of such service zones each of which may perform that or a similar function. Furthermore, while the present disclosure does not discuss in detail how each service zone may connect to global cloud 202, one skilled in the art will appreciate that the present disclosure contemplates the use of any technique known for such connections. For example, satellite 206 may be a geostationary satellite or a low earth orbiting satellite or any other type of satellite capable of providing bidirectional communication between global cloud 202 and satellite storage zone 210. Furthermore; satellite 206 may use communication technologies such as, for example, Time Division Multiple Access (TDMA), or Single Channel Per Carrier (SCPC) or other satellite storage zone 210. Similarly, Wireless/BP L zone 222 may include devices such as BPL access points that provide the technology for transmitting data over electric powerlines. In addition, or alternatively, Wireless/BPL zone 222 may use wireless adapters using frequency modulation techniques such as, for example, OFDM for wireless communications between Wireless/BPL storage zone 228 and Wireless/BPL zone 222.

System 200 may include additional cloud computing service zones. These may include a personal computing and communications zone 232, a cellular network zone 240, a home or office zone 244, or an ISP zone 248 or any combination thereof. In an embodiment, personal computing and communication zone 232 may include a PC, laptop, PDA or other computing device or any combination thereof. For example, as shown in FIG. 2, personal computing and communication zone 232 includes laptop/netbook 234. Laptop/Netbook 234 may include a secure storage volume V-6. The characteristics of secure storage volume V-6 may be similar to those of secure storage volumes V-1 through V-4 in that it is capable of storing data processed according to techniques consistent with the present disclosure. Furthermore, personal computing and communications zone 232 may also include a USB drive 236 that is insertable into laptop/netbook 236. USB drive 236 may include yet another secure storage volume V-7 similar to other storage volumes in system 200. Additionally, smart phone 238 may also be part of personal computing and communications zone 232. Smart phone 238 may include yet another storage volume V-8 similar to other storage volumes in system 200. Smart phone 238 may connect via a cellular network such as a 3G, 4G, Long Term Evolution ("LTE"), or any other such network to cell tower 242 in cellular network zone 240. Cell tower 242 may interface with global cloud 202 to provide bidirectional communication between global cloud 202 and smart phone 238.

One of skill in the art will appreciate that while FIG. 2 depicts one laptop/netbook 234, and one smart phone 238, other kinds of personal computing devices and smart devices and any number of such devices, each including secure storage volumes, may be used without departing from the scope of this disclosure.

In an embodiment, personal computing and communications zone 232 may also connect to a home or office zone 244. The connection between personal computing and communications zone 232 and home or office zone 244 may be via any communication network such as, for example, a Virtual Private Network ("VPN") as depicted in FIG. 2. Furthermore, home or office zone 244 may include one or more workstations 246. Workstation 246 may include storage secure volume V-5 which may be similar to other secure storage volumes in system 200.

Personal computing and communications zone 232 and Home or office zone 244 may connect to ISP zone 248. The connection between these zones and ISP zone 248 may be wired or wireless via networking equipment such as, for example, modem/router 250, or other such equipment. ISP zone 248 may provide bidirectional communication between global cloud 202, personal computing and communications zone 232 and Home or office zone 244.

One of skill in the art will appreciate that personal computing and communications zone 232 and home and office zone 244 may be directly connected to the Wireless/BPL zone 222, which may provide bi-directional connectivity between zones 232, 244, and the global cloud 202. The connection between these zones and workstation 246 and laptop 234 may be wired via networking equipment such as, for example, BPL modem connected to an electric power outlet (not shown), or wireless via one or more wireless antennas such as, for example, WiFi, WiMax, MIMO, cell phone, or such other equipment (not shown) mounted on power poles connected to one or more BPL modems 226. One of skill in the art will also appreciate that wireless cell phone antennas may be as large as cell phone towers 242 or as small as conventional WiFi antennas, or any other size, and could facilitate communication between devices such as, for example, workstations 246, laptops 234, and smart phones 238. In addition, one of skill in the art will appreciate that workstations, laptops, and smart phones or other devices such as, for example, pods, pads, tablets, and the like may receive and playback audio and/or video content. This may facilitate the novel hybrid BPL communication networks. For example, alternative embodiments may include mounting WiFi, WiMax, or low power cell phone antennas on power poles connected to BPL access points. Using low power cell phone antennas may be especially useful since they may be mounted at the top of power poles, thereby reducing or eliminated two inherent problems limiting the performance and reliability of convention cell tower deployment techniques. Since power poles are placed approximately 325 feet to 340 feet apart, low power cell phone antennas would follow the topology of the land. That may reduce or eliminate cell phone signal dead zones. This may also reduce or eliminate the need for conventional cell towers that broadcast high power transmissions for miles. This practice consumes substantial amounts of electrical energy imposed by the power robbing inverse square law, i.e. energy decreases by a factor of 4 as the distance doubles. Low power cell phone antennas, mounted on power poles, may be flexibly placed to reduce energy costs which would may reduce carbon dioxide emissions and improve cell signal coverage and clarity. This may also reduce construction and maintenance cost associated with building and maintaining cell phone transmission facilities.

One of skill in the art will appreciate that the description of cloud computing system 200 is for example purposes only and that many variations of cloud computing system 200 fall within the scope of this disclosure. For example, alternative embodiments could include additional or fewer cloud computing service zones and/or different types of cloud computing service zones. Furthermore, each cloud computing service zone could have multiple secure storage volumes and each device in a cloud computing service zone may have multiple secure storage volumes.

A user of system 200 may use software running on a processor, hardware, or any combination thereof embodying the information compression, encryption, dispersal, transmission, and storage techniques discussed above to ensure that information stored on the user's data processing system and the cloud data processing system is at all times maintained in a state that is indecipherable to unauthorized use and that no single device in a cloud computing service zone may contain a complete dataset of any information file. For example, a user may create or modify a data file on laptop/netbook 234. In addition; the user may have access to all the other cloud computing service zones depicted in FIG. 2. By using techniques consistent with the present disclosure as described; for example, with respect to FIG. 1, software running on a processor, hardware, or any combination thereof on laptop/netbook 234 may compress and encrypt the data file. In addition, if system 200 is configured to disperse the data file according to techniques consistent with the present disclosure into 8 volumes (t=8) such that 2 out of the 8 volumes (m=8) contain a complete data set, then the user may backup this data file by dispersing it into 8 separate volumes spread across secure storage volumes V-1 through V-8 in system 200 as depicted in FIG. 2. If techniques are practiced according to those consistent with the present disclosure, periodic backups as practiced by conventional wisdom may no longer be necessary because information is stored in 8 local and remote locations as soon as each file is saved, making backups only desirable for creating archival snapshots to preserve a historical record of the evolution of data over time. Thus, portions of the data file may be stored in laptop/netbook 234, smart phone 238, usb 236, workstation 244, and servers 212, 216, 218, and 228 such that no device contains a complete copy of the data file. One of skill in the art will appreciate that for system 200 to work in the manner described, all the devices in system 200 would include software running on a processor, hardware; or any combination thereof that would allow for the processing and storage of data using techniques described in the present disclosure. When the user decides to retrieve his data file, he can do so by restoring the data file from any 2 of the 8 volumes. Thus, any 6 of the 8 volumes could be destroyed without affecting the integrity of the user's data file.

In an alternative embodiment, the retrieval of volumes may be prioritized so that a computing device attempts to first retrieve volumes which are locally stored before it accesses volumes which are remotely stored. This technique which is consistent with the present disclosure may conserve bandwidth and accelerate the retrieval process. Likewise, the transmission of volumes may be prioritized so that the controller attempts to first transmit volumes to local storage devices before transmitting volumes to remote storage locations. This technique which is consistent with the present disclosure may provide greater assurance that "m" data will survive the storage process, because local devices have a higher probability of receiving the data intact and more rapidly than remote locations.

In yet another embodiment, "m" volumes may need to be saved to preserve data integrity. In such a case, the computing device may attempt to use the m volumes to generate the desired number t volumes subsequent to the save process or at a future time. This feature may be used in mobile ad hoc radio because it is assumed that multiple receiving units may be offline or out of range when the save cycle is initiated.

System 200 may make it possible for all of a user's computing and communications devices to share a single library of data that is compressed, enciphered, and randomly or pseudo randomly separated into original data units, like bits, nibbles, bytes, and/or blocks, and dispersed into eight secure storage volumes of variable size that are linked with the cloud. As discussed above, the values of "t" and "m" are selectable by a user of system 200 and are not limited to those used in the disclosure above.

System 200 may allow a user to maintain his computing and communications environment irrespective of his actual location. This location-agnostic feature of the present system is possible because techniques described by the present disclosure are transmission medium and transmission protocol agnostic. Thus, a user could be at any location on air, land, or sea, and could be mobile or stationary but yet always have access to data backed up on cloud computing system 200 as long as he can connect to such a system.

Cloud computing system 200, in accordance with the present disclosure discussed above, includes several features. Data may be enciphered using any one, or a combination, of encryption algorithms such as, for example, PSquared, AES-256, 3DES, or Two Fish. Furthermore, because data may be stored and transferred in a compressed state, data transfers to and from the cloud are typically accelerated. Furthermore, because compressed and/or enciphered, datasets may be separated into primary data elements, like bits, nibbles, bytes, and/or blocks, which are subsequently dispersed as partial datasets to multiple local and global locations in a deterministic or non-deterministic manner, no complete dataset ever exists in a single volume, or in a single storage location, or if desired never travels over a single network node or route. In addition, volume names and filenames may be created and recreated as random alphanumeric strings each time data is saved so no one can discern what sort of data a file contains from the file or volume name.

The transmission techniques used in the above-disclosed system may also make it difficult to determine which data storage location is holding which portion of a dataset. Specifically, files and volumes may be deterministically or non-deterministically dispersed over new and different network routes to new and different storage locations each time a dataset is saved or transmitted, thereby creating a "data shell game" where no one, including the owner of the data, knows which storage location is holding which volume or which partial dataset.

Similar to the features discussed with respect to FIG. 1, a system in accordance with the present disclosure may interrogate a secure storage volume to determine the amount of storage space available and deterministically or non-deterministically generate a partial dataset to store on the interrogated volume.

In an alternative cloud computing embodiment, a bit stream may first be disassembled into multiple data streams or volumes and then each data stream or volume may be encrypted separately. Furthermore, additional security may be provided by encrypting each volume or data stream with a different key. In yet another embodiment, each volume or data stream may be encrypted using a different algorithm that may be deterministically or non-deterministically be selected from a pool of potential encryption algorithms.

In yet another embodiment, the systems 100 and 200 discussed above may practice extreme information obfuscation and bandwidth conservation ("XIOBC"). Many systems such as, for example, cloud computing systems use applications such as, for example, word processing programs, spreadsheet programs, graphic image processing programs, and the like to create and manipulate users' data, or in wireless and BPL access points for transmitting and receiving information such as autoconfiguration data. These operations may require substantial transfers of data between users and cloud computing resources, all of which may require protection from cyber attacks such as, for example, man-in-the-middle, man-in-the-browser, denial of service, and other forms of cyber attack. The obfuscation techniques comprising XIOBC may strengthen the data security techniques practiced by the data shell game by creating a plurality of information building blocks that may be referenced from one or more local or remote locations. By so doing, usable information may be constructed. An additional embodiment contemplated by the present disclosure is a system that may reduce the need to transmit data that is commonly used by such applications.

The basic architecture of this embodiment may be the same as system 100 in FIG. 1. Therefore, a detailed discussion of each component will not be repeated for purposed of brevity. Rather, only those aspects relevant to an alternative embodiment will be discussed below.

Computing devices, 130 and 174 may be configured in software running on a processor, other hardware, or a combination of both to perform techniques consistent with the present disclosure. At a high level, computing device 130 and point computing device 174 may store data in the form of one or more arrays, called an XIOBC array. In order to transfer information stored in an XIOBC array, computing device 130 may form a pointer pointing to data in the one or more data array, wherein the pointer references data in the corresponding data array. The pointer may be a two dimensional pointer. In addition, after an initial transmission, rather than transmitting the data stored in an XIOBC array, computing device 130 may transfer only the pointer for any data item of the one or more data arrays to computing device 174 across local network 150 and communication network 160. Upon receipt of a pointer, remote computing device 174 may reference the data stored in a local XIOBC array. Thus, the present system may allow computer device 130 to store incomplete indiscernible information on an attached local data storage device or remote data storage device, or both, and by sending a pointer referencing at least one data building block stored in a local, network, or remote XIOBC array, assemble at least one complete dataset in volatile memory such as, for example random access memory ("RAM"), and use the at least one complete dataset for any computer-related purpose and zeroize the at least one complete dataset. Using XIOBC arrays in such a manner may allow users to create sensitive information such as, for example, passwords, social security numbers, nuclear launch codes, and the like. These as needed, on-the-fly, single use datasets may evaporate, e.g. be zeroized, after each use, having never resided on a non-volatile storage device so no residual image of the at least one complete dataset ever exists beyond its moment of use. The present system may also reduce the actual amount of data passed between computing devices 130 and 174.

In an embodiment, computing devices 130 and 174 may include a controller (not shown) configurable to perform the abovementioned features. These may include, for example, at least a portion of a control processing unit configured to execute software instructions that may perform these features, at least a portion of one or more memory units that store these software instructions, and any other components necessary to perform the abovementioned features.

Specifically, a controller in computing device 130 may be configured to create a fixed or variable length XIOBC array and populate the array with data. This data may be user data, metadata or any other kind of data that needs to be stored on computing device 130. The XIOBC array data may include, for example, a string of fixed length, an integer, a real number, an internal pointer, an external pointer to another XIOBC array, an external pointer to a software program or utility, a code block or element of a code block, an executable instruction or an element of an executable instruction, or one or more parameters and/or arguments to initialize a code block or executable instruction, or any combination thereof. Alternatively, if a XIOBC array already exists it may be populated with only such data that is missing or needs modifying. In an embodiment, a XIOBC array is stored in at least one memory component of computing device 130 and at least one or more component of computing device 174. For example, if computing device 130 is, for example, an OFDM device or a smart phone, the array can be preloaded to reside in memory. Alternatively, the XIOBC array can be preloaded to reside in volatile or nonvolatile memory. In yet another alternative embodiment, if the XIOBC array is not preloaded, it would be created and populated with information during an initialization process.

For example, in an embodiment, the XIOBC control array(s) can be pre-packaged within the device firmware and thereafter remain unchanged until the device receives an update. Alternately, the control array may not be prepackaged. Rather, it may only have a memory allocation in the device. A device attempting to transmit pointers may first test to see if the array is present and, if it is, determine if it is the current version. If the array is present and up-to-date, the device may send the package of one or more pointers. However, if the array is not present and up-to-date, the device may first send the array and then follow up with a package of one or more pointers.

The controller in computing device 130 may be further configured to form a pointer for any data item in one or more XIOBC arrays. Thus, each two-dimensional pointer may reference data in a corresponding XIOBC array. In an embodiment, the controller in computing device 130 may create such a pointer by separating a byte into 2 nibbles to create a xy pointer to a XIOBC array, which may be configured as a two dimensional XIOBC table.

The controller in computing device 130 may be further configured to then pass the pointer across local network 150 and communication network 160 to remote computing device 174 instead of transferring the actual data stored in their corresponding XIOBC arrays. Upon receipt of the pointer, remote computing device 174 may use the received pointer to reference the corresponding data from the XIOBC arrays stored in computing device 174. Use of such a technique may conserve bandwidth on networks because the pointers transferred across a network may use a fraction of the bandwidth that would have been used if the data that the pointers referenced had been transferred.

One of skill in the art will appreciate that computing device 130 may include a component other than a controller that may perform the abovementioned features. That is, any hardware component, software component, or any combination thereof, that may cause computing device 130 to provide the features discussed herein may be used without departing from the scope of this disclosure.

One of skill in the art will appreciate that computing devices 130 and 174 from FIG. 1 were used for example purposes only. That is, the above disclosed XIOBC data obfuscation and bandwidth conservation techniques can be used to transfer data between any two devices configured with the appropriate software, hardware, or a combination thereof, to perform techniques consistent with the present disclosure. Furthermore, while an embodiment for XIOBC data obfuscation and bandwidth conservation was discussed with respect to system 100, one of skill in the art will appreciate that the above-discussed techniques may be used in a cloud computing system such as system 200 described with respect to FIG. 2, without departing from the scope of this disclosure. Additionally, the XIOBC data obfuscation and bandwidth conservation techniques described above may be used by themselves or in conjunction with the data parsing, compression, encryption, disassembly, and dispersion techniques consistent with the present disclosure.

Techniques consistent with the present disclosure may help increase the throughput rate of WiMax networks. For example, in an embodiment, the compression feature disclosed above may increase the throughput of WiMax devices from about 10 Mbps at about 10 kilometers to about 20 Mbps to about 40 Mbps at about 10 kilometers depending upon the type of data being transferred and other factors like sun spot, atmospheric considerations like humidity and lightning, among others. This may increase the use of wireless access points consistent with the present disclosure as backhaul devices in hybrid BPL and wireless networks, thereby reducing reliance on fiber optic cable for backhaul operations.

Furthermore, separating and dispersing data streams using XIOBC techniques may obfuscate all or part of said data streams consistent with the present disclosure. Transmitting the separated data over multiple channels, frequencies, or sub-frequencies may further increase data security features practiced by the data shell game.

Furthermore, separating and dispersing data streams using techniques consistent with the present disclosure and transmitting the separated data over multiple channels, frequencies, or sub-frequencies may further increase the effective bandwidths of wireless devices practicing this system by about 2 to as many as about 18 times or more above the standard data transmission rate of these wireless devices.

The present system may also be used in Unicast Multimedia Presentation Services. Generally, unicast presentation services may be preferred over multicast presentation services. Some of the perceived limitations of multicast presentation services are that multicast presentation services do not allow for any direct interaction between a host broadcast service and its users and that multicast services cannot provided a true video-on-demand service. Unicast presentation services overcome these limitations but are bandwidth intensive. Practice of the present system may enhance the effectiveness of Unicast Multimedia Presentation Services. For example, when streaming video files and other rich content multimedia files are compressed and/or rendered indecipherable to unauthorized use, and geographically dispersed into a multitude of storage locations in accordance with the present disclosure, several limitations pertaining to delivering content-on-demand, video-on-demand, TV-on-demand, and other such rich multimedia content services to globally distributed communities of subscribers may be remedied. For example, the bandwidth limitations faced by existing unicast presentation services may be overcome by using the compression and/or information dispersal and encryption techniques consistent with the present disclosure.

The present system may also be used to satisfy the needs of content providers. Some of the concerns voiced by content providers such as, for example, Viacom, Comcast, Miramax, Paramount, and Sony Films, are content management rights security and the need to maintain content quality standards that are suitable to the content provider. Practicing the present system may provide techniques for imposing a dispersed digital rights management ("DDRM") system to protect the distribution and playback of digital multimedia files. Additionally, practicing the present system may meet or even exceed the quality and security concerns of content providers by modifying conventional digital multimedia files like AVS, MPEG-2, MPEG-4, or such other video codecs and/or MP3, AC-3, G.722.2, WMA, or such other audio codecs in such a manner that the digital multimedia files are indecipherable to eavesdropping, file sharing, piracy, theft, and the like. In addition, practicing the present system may serve the needs of network providers by using the compression and/or information dispersal and encryption techniques consistent with the present disclosure in such a manner that audio and/or video streams are securely compacted and/or accelerated to a level that is not achieved through other means. Additionally, bandwidth conservation methods of the present disclosure may reduce the amount of network control information needed to support unicast streaming services.

The present system may also enhance services delivered by satellite. Specifically, practicing the present system may secure satellite systems by compressing and/or enciphering, and dispersing data so as to accelerate bidirectional transmissions of satellites. Furthermore, the present system may also further enhance security by dispersing dispersed data subsets over multiple frequencies. In addition, by practicing the bandwidth conservation techniques consistent with the present disclosure, the transmission of all control instructions for a satellite system may be further accelerated and secured by constructing the control instructions from abstracted data primitives preloaded in the satellite's XIOBC array set. This may make harmful hacking of the satellite system very difficult because the abstracted data primitives may be changed at random intervals Enhanced security may be achieved by periodically at random intervals, or at intervals which are deterministically established, replace the XIOBC information arrays with new versions, whereby the data referenced in the array elements are modified or repositioned within the array and the pointers referencing this data are updated to reflect these changes, further obfuscating access to information.

Figure 3:
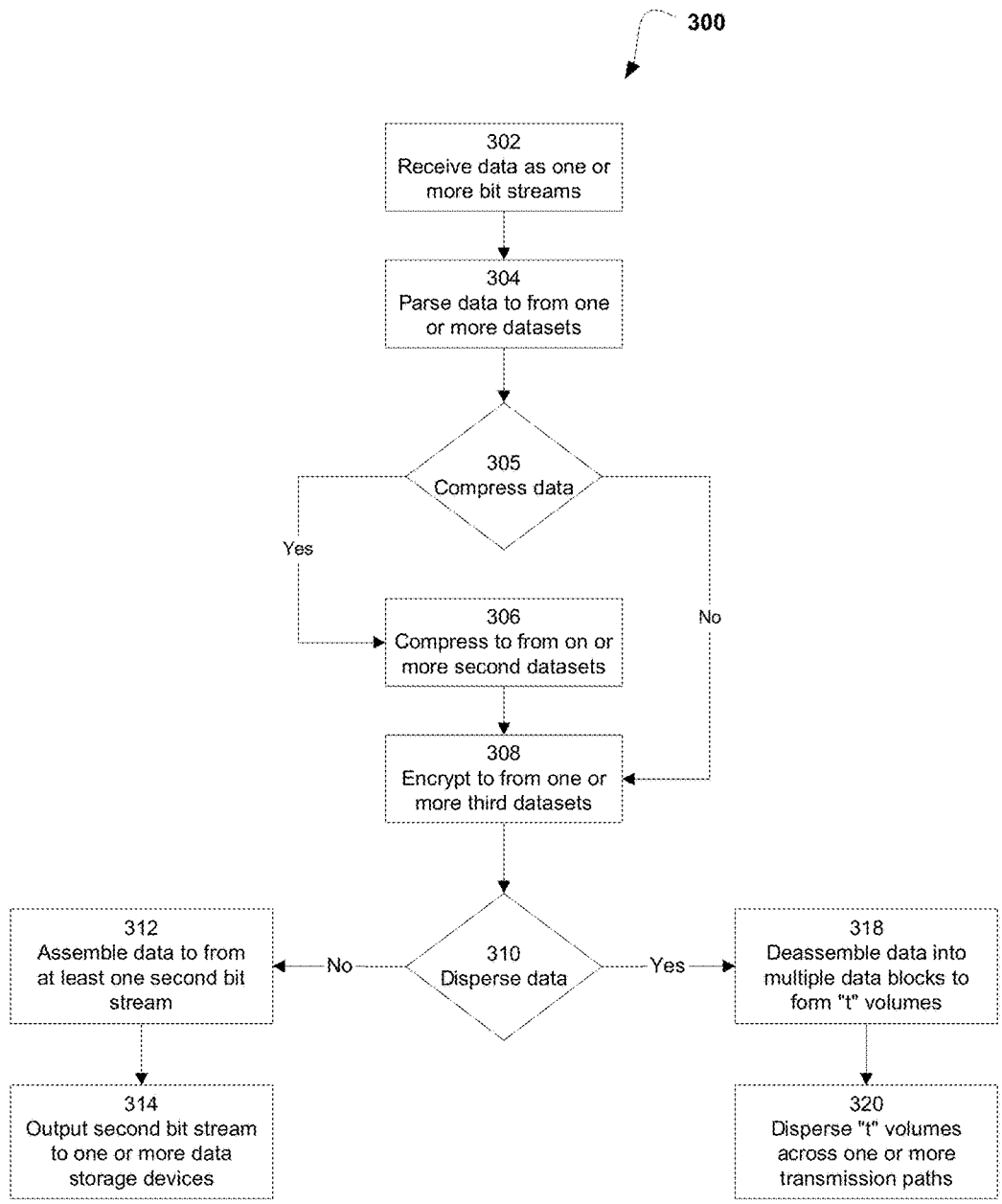
FIG. 3 is a flow chart representation of a method 300 for securely transmitting and storing digital information in a communication network according to a disclosed embodiment.

FIG. 3 provides a flow chart representation of a method 300 for securely transmitting and storing digital information according to an embodiment consistent with the present disclosure. In an embodiment, the disclosed method may include an algorithm coded into computer software executable on one or more computing devices.

At step 302, a computing device such as, for example, computing device 130 in FIG. 1 or device 234 in FIG. 2, receives data in the form of one or more bit streams from an input device such as, for example, input device 110 or local network 150 in FIG. 1 or from any device or network in FIG. 2. At step 304, a parsing module such as the one described above with respect to FIG. 1, within the computing device parses the one or more bit streams to form one or more first datasets. At step 305 a computing device, such as the one described above with respect to FIG. 1, makes a decision as to whether the one or more first datasets needs to be compressed. If the data in the one or more first datasets is deemed by the computing device to be resistant to compression, this step is skipped and program execution advances to step 306. Otherwise program execution advances to step 308 where one or more of a plurality of compression algorithms are applied to the dataset. At step 306, a compressing module such as the one described above with respect to FIG. 1, in the computing device compresses the one or more first datasets to form one or more second datasets. At step 308, an encryption module such as the one described above with respect to FIG. 1, within the computing device cryptographically modifies the one or more second datasets to form one or more third datasets. At step 310, a decision is made within the computing device as to whether the data in the one or more third datasets needs to be dispersed. If the data does not need to be dispersed, then at step 312 an assembly module in the computing device assembles the one or more third datasets to form at least one second bit stream. At step 314, the at least one second bit stream is output to one or more data storage devices. These may include, for example, local data computing devices 140, 142, 144, and 146 and/or remote computing devices 172, 174, 176, and 178 in FIG. 1. In an alternative embodiment, the data storage devices may include any of the devices depicted in FIG. 2 such as, for example, servers 212, 216, 220, and 230.

On the other hand, if at step 310, a decision is made by computing device 130 to disperse the data in the one or more third datasets, then at step 318, a dispersal module such as the one described above with respect to FIG. 1, in the computing device disassembles the one or more third datasets into multiple data blocks to form "t" volumes as part of at least one second bit stream such that "m" number of volumes contain a complete data set, wherein m<t. At step 320, the dispersal module in the computing device disperses the t volumes across one or more transmission paths and stores the t volumes across a plurality of distributed storage locations, such that no complete dataset is stored at a single storage location. These storage devices may be any combination of local data computing devices 140, 142, 144, and 146 and remote computing devices 172, 174, 176, and 178 in FIG. 1. In an alternative embodiment, the data storage devices may include any of the devices depicted in FIG. 2 such as, for example, servers 212, 216, 220, and 230, including but not limited to office and home office storage devices 234, 236, and 246. In addition, a personal smart phone may be used as a storage device that communicates with any or all of local data computing devices 140, 142, 144, and 146 and remote computing devices 172, 174, 176, and 178 in FIG. 1, by means of cell tower 242 in FIG. 2.

Figure 4:
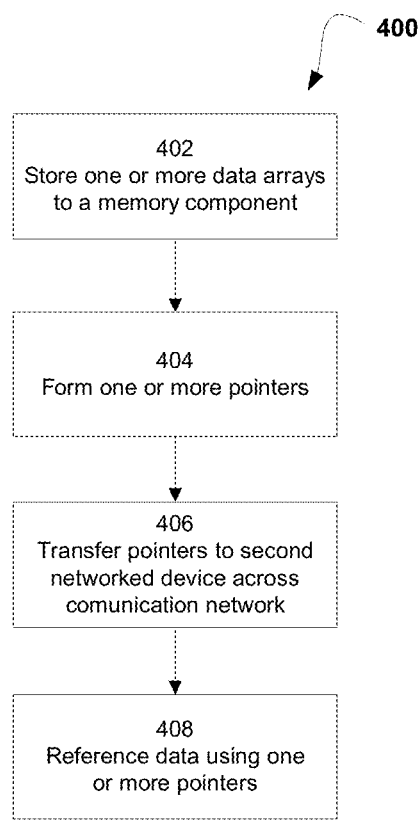
FIG. 4 is a flow chart representation of a method 400 for obfuscating data in a communication network and conserving bandwidth during the transmission of data between a plurality of networked devices according to a disclosed embodiment.

FIG. 4 provides a flow chart representation of a method 400 for obfuscating data in manner consistent with the techniques of the data shell game and/or conserving bandwidth during the transmission of data between a plurality of networked devices according to an embodiment consistent with the present disclosure. In an embodiment, the disclosed method may include an algorithm coded into computer software executable on one or more computing devices. At step 402 a first networked device such as, for example, computing device 130 in FIG. 1 (or device 234 in FIG. 2) which is connected with a communication network such as communication network 160 in FIG. 1 (or global cloud 202 in FIG. 2), may store one or more data arrays in at least one memory component. Similarly, a second networked device such as, for example, remote data computing device 174 in FIG. 2 (or server 230 in FIG. 2) may store one or more data arrays in at least one memory component. At step 404, the first networked device may form a pointer for each data item in the one or more data arrays, wherein each pointer references data in the corresponding data array. At step 406, the first networked device may transfer the pointers for each of the one or more data arrays to the second networked device across the communication network. At step 408, the second networked device 174 may reference data stored in the one or more data arrays via the transferred corresponding pointers. In an embodiment, the pointers may be two dimensional.

Dispersing files to multiple discrete locations as described herein may be performed along with additional techniques which may enhance security. For example, no two share volumes may have any discernible information in common (e.g., the filenames of all share volumes may be uniquely different from one another and may have nothing in common with the original filename). The sizes of dispersed volumes vary from storage location to storage location. The file metadata for the dispersed volumes, such as time created, time modified, and time accessed, may be set to the same date or to random dates. The file attributes for the dispersed volumes may be set to the same date or to random dates.

Thus, a would be hacker may need to penetrate multiple geographically separated locations in order to acquire the minimum number of share volumes to reassemble a complete dataset while being misled by the characteristics of the dispersed volumes themselves.

GDVD—Globally Dispersed Virtual Datacenter

The term "datacenter" as used herein refers to a group of networked computer servers, storage devices, and supporting hardware and software for remote storage, processing, and distribution of data.

The term "transmission path" as used herein refers to a path between two nodes of a network that a data communication follows including, for example, the physical cabling that connects the nodes on a network and the signal that is communicated over the pathway or the subchannel in a carrier frequency.

The term "data bloat" as used herein refers to the increase in the quantity of total data that must be stored in order to assure that original data will continue to persist if anything alters, damages, or destroys the original data.

The term "attack threat" as used herein refers to an index number of 1 to n that indicates the total number of data storage facilities holding a complete dataset of discernible information a cyber attacker would have to penetrate to steal the discernible information. The higher the number, the greater the threat.

One of skill in the art will further appreciate that no process of the present disclosure is truly random. Thus, while the pseudorandom or non-determinist processes so employed may use seemingly arbitrary decisions and criteria to select the methods by which data is modified, in all cases the processes so employed to modify data are stepwise procedures that act to modify data for a specific purpose. Each process so employed for parsing, compressing, encrypting, and dispersing is non-random (deterministic). Therefore, by precisely reversing the sequence of processes, the data may be restored to its original form in a stepwise reverse fashion. Even if information is dispersed by disassembling the information, generating a random number sequence, and associating the dataset with the random number sequence, returning data to its original state is a matter of using the same random number sequence, but running the processes in the opposite direction to reassemble the information. All such processes are lossless. Because all techniques employed by the present disclosure which do the work of modifying data are non-random, all such techniques are reversible.

Figure 5:
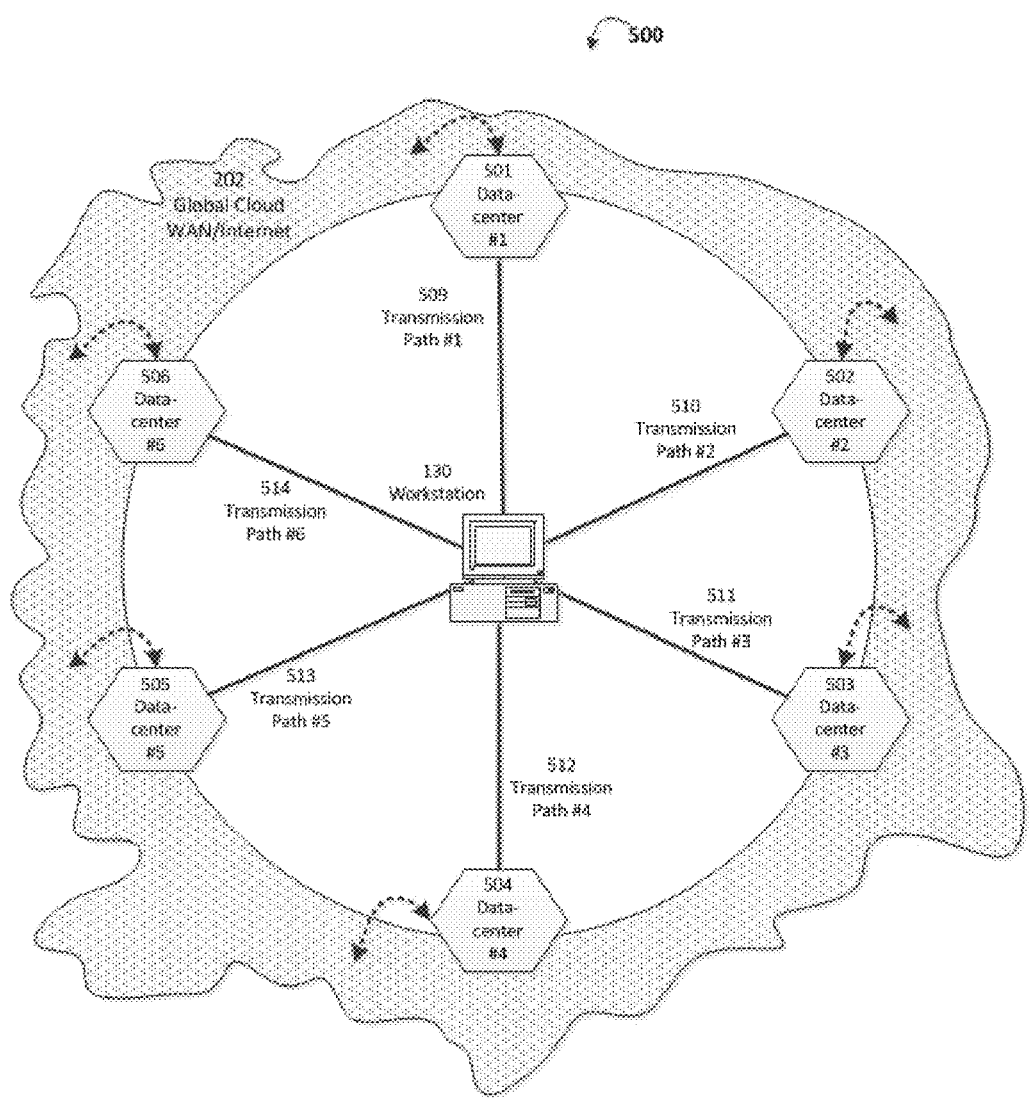
FIG. 5 is a schematic diagram representation of a system 500 for creating and operating a globally dispersed virtual datacenter for securely transmitting and storing information and virtual machines according to a disclosed embodiment.

FIG. 5 provides a schematic representation of a system 500 for designing, assembling, and operating a globally dispersed virtual datacenter ("GDVD"), for securely transmitting and storing digital information and virtual machines, according to a disclosed embodiment. System 500 includes at least one computing device 130 in FIG. 1, a plurality of globally separated datacenters 501, 502, 503, 504, 505, and 506, and a plurality of globally separated transmission paths 509, 510, 511, 512, 513, and 514 connecting computing device 130 in FIG. 1 to the plurality of globally separated datacenters. In addition, the globally separated datacenters may each be connected to the global cloud 202 in FIG. 2. Optionally, computing device 130 in FIG. 1 may be connected to the global cloud 202 in FIG. 2 via networking equipment such as, for example, modem/router 250 in FIG. 1. In addition, datacenters 501, 502, 503, 504 505, and 506 may be connected to the global cloud 202 in FIG. 2 via networking equipment (not shown).

Computing device 130 in FIG. 1 may be configured with software running on a processor, other hardware, or any combination thereof, to disperse at least one first dataset into a plurality of share volumes and to transmit each of the plurality of share volumes to a plurality of datacenters and to receive a minimum number of share volumes from the plurality of datacenters and reassemble them into a second dataset that is losslessly identical to the first dataset in a manner consistent with the present disclosure. When a dataset is processed in such a manner, the dataset may exist as a data dispersion throughout the plurality of datacenters. The embodiments described herein may provide the dataset with ultra-high security, resilience to manmade and natural disasters, high persistence, and high availability. This may be accomplished with a minimum of data bloat.

Each datacenter 501, 502, 503, 504, 505, and 506 may be configured with software running on a processor and/or other hardware constructed and arranged to receive and store share volumes transmitted by computing device 130 in FIG. 1 and to retrieve and/or transmit share volumes to computing device 130 in FIG. 1. In addition, datacenters 501, 502, 503, 504, 505, and 506 may collectively be configured to work together as a wholly or partially unified GDVD.

Data bloat may be especially deleterious in at least two respects: it increases data storage capacity requirements and it increases the data's vulnerability to cyber attack. For example, using conventional wisdom, the total amount original data stored is 100% and the attack threat is 1. A single backup copy of the original data increases the total data stored to 200% (single redundancy) and the attack threat is 2, two backup copies 300% (double redundancy) and the attack threat is 3, three backup copies 400% (triple redundancy) and the attack threat is 4. Conventional wisdom generally assumes that triple redundancy is required to assure information will persist with a near-zero chance of loss or corruption. While this may be true, it does not take into consideration that the data is stored in 4 datacenters instead of 1, which elevates the likelihood of cyber attack to 400%.

Diagram 500 shows, for example, 6 datacenters which may utilize the resources of 6 geographically distributed physical data storage facilities to form a single, wholly or partially, unified GDVD, which, for example, may be connected to computing device 130 in FIG. 1. The computing device 130 may be configured with an efficacious information dispersal algorithm ("IDA"), to disperse a first dataset. By using a 3-of-6 splitting ratio, 6 share volumes may be generated in a manner consistent with the present disclosure, and 1 share volume may be conveyed to each of the 6 datacenters. If computing device 130 in FIG. 1 is further configured with an IDA to receive a minimum of 3 share volumes from any of the 6 datacenters and reassemble the 3 minimum share volumes to generate a second dataset in a manner that is losslessly identical to the first dataset, data bloat may never be greater than 200%. In addition, 4 datacenters may have to be destroyed or disabled to lose enough share volumes that a first dataset could not be reassembled, which is analogous to having triple redundancy with only half the data bloat. In addition, the cyber attack threat may be reduced to near-zero since an attacker would have to successfully locate and break into 3 data centers, defeat all of the obfuscation defenses provided by the data shell game, and obtain or reverse engineer the IDA to have a chance of obtaining discernible information.

If the size of a GDVD is increased, for example, to 12 datacenters, and computing device 130 in FIG. 1 is configured to disperse and reassemble a dataset using a 6-of-12 splitting ratio, the size of each of the 12 share volumes may be reduced by ½ so the amount of data bloat would remain 200%, the same as a 3-of-6 splitting ratio, while data security, persistence factors, and network throughput rates would increase significantly.

Conventional wisdom generally assumes that to preserve data resiliency for most personal, corporate, and government purposes two complete sets of data, an original and a secondary, i.e. backup dataset, must be maintained. In some cases a synchronization appliance such as, for example, NetApp®, is used to keep the original and backup data nearly identical. With GDVD there may be no need to back up data unless an archival snapshot is required to preserve the state of data at a particular moment in time. When the systems and methods described herein are practiced, data may never need to be backed up because every time an original dataset is saved, it is dispersed, and all new share volumes are generated to replace the old share volumes and, consistent with the protections provided by the data shell game, the all new share volumes may be assigned all new filenames, file sizes, and file metadata further confounding a cyber attacker's ability to locate, identify, and acquire enough share volumes to reassemble a dataset. All data, for all datasets, may exist in a dispersed and obfuscated subset of the original dataset, which may be stored throughout the total number of datacenters in the GDVD. Since all GDVD datacenters are geographically separated from one another, it may become a near-impossibility for a cyber attacker to ever acquire enough share volumes to reassemble a complete dataset.

Practicing the conventional wisdom of maintaining a maximum of two geographically separated datacenters, two near-simultaneous events such as, for example, an earthquake and a hurricane such as, for example, Katrina, may destroy or incapacitate both datacenters. There exists a substantial likelihood that a large amount, perhaps all, of the data stored in the two datacenters would be irretrievably lost. Practicing the systems and methods described herein, losing 3 datacenters of the example GDVD may have little to no negative effect upon GDVD network operations, since all data would still exist throughout the remaining 3 datacenters.

Modern servers may not be servers in the sense they were when conventional data resiliency standards were fabricated. Servers today may be virtual machines ("VM") mounted on hardware. A virtual machine is actually a file or group of files. Consequently, a VM is data. The systems and methods described herein may make it possible and practical to disperse all, or substantially all, of the VMs in all of the datacenters, and convey the VM share volumes thus generated to all of the datacenters in the GDVD a manner consistent with the present disclosure. Each VM may be present, as a data dispersion, throughout the total number of datacenters and have focus in one. The VM may be running in the one datacenter where it has focus.

All VMs in a GDVD may be configured according to a single standard configuration, or there may be a group of different standard configurations, or all VMs may be individually configured, or any combination thereof. If a VM with focus fails for any reason (e.g., if there is a problem with the datacenter where the VM has focus, or if the VM itself becomes corrupted, etc.), the IP address of the VM may be rapidly reassigned to a VM of its configuration in another datacenter, according to a preexisting failover plan. If the VM that failed was a critical VM, a VM of its configuration may exist on hot standby in the another datacenter. If a hot standby VM of the failed VM's configuration does exist, it may be assigned the failed VM's IP address and processing may continue normally with little to no interruption of service. If the failed VM does not have a VM of its configuration in another datacenter, a replacement VM can be reassembled in any functioning datacenter that may be losslessly identical to the failed VM. The disbursed VM share volumes may be used to reassemble the VM at the new datacenter. The replacement VM may be assigned the failed VM's IP address and booted up. After the replacement VM comes online, processing may continue normally with only minimal interruption of service. In any case, when a replacement VM comes online it may not need any configuration since the environment throughout the GDVD should be a consistent wholly, or partially, unified virtual environment.

By practicing the present embodiment, data security, persistence, resilience, and availability may be consistent with the conventional level of triple redundancy, with little to no increase in network equipment and operating costs, while data bloat may remain consistent with the conventional level of single redundancy. Disaster recovery and loss mitigation practices and policies may be modified to reduce the complexity and cost thereof. In addition, data transmission throughput rates may be substantially increased as data transmitted over network paths allows multiple smaller subsets of that data to be transmitted in parallel fashion over multiple transmission paths.

On-the-Fly Security Automation and Obfuscation

The terms "user space" and "kernel space" as used herein refer to protected segments of the computer operating system ("OS") virtual memory. An OS may segregate virtual memory into kernel space 610 and user space 609. This separation serves to protect data and functionality from faults and malicious behavior. The kernel space 610 is reserved for the exclusive use of the OS. The OS constrains the computer interactions of users to the user space 609 Therefore users have no knowledge of, or access to, processes operating in, or data stored in, the kernel space 610.

Figure 6:
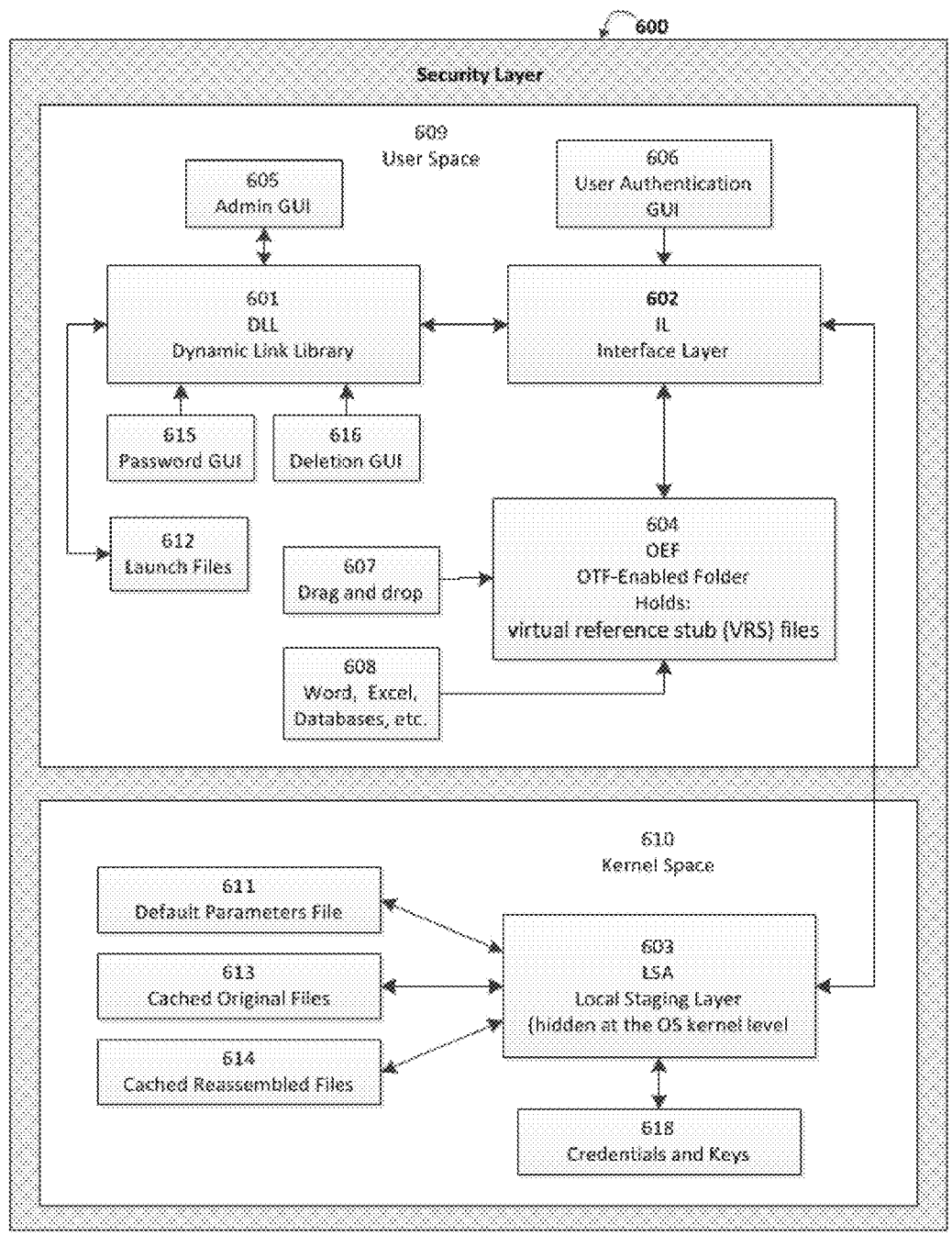
FIG. 6 is a schematic diagram representation of a system 600 for automating the dispersal and reassembly of data and increasing data security in a communication network by programmatically constraining user interactions with data to the user space of the operating system and constraining data to the kernel space of the operating system according to a disclosed embodiment.

FIG. 6 provides a flow chart representation of a system 600 for automating the dispersal and reassembly of data, according to a disclosed embodiment. System 600 may create a special security layer ("security layer") that confines all user interactions with data to the user space 609, and all data to the kernel space 610. This separation may increase data security and data obfuscation in a communication network by removing the user from the use case. In particular, the separation may expressly increase the efficacy of the obfuscation techniques taught by the data shell game.

Cybersecurity experts generally agree that users pose the greatest threat to cybersecurity by intentionally or unintentionally causing sensitive information to fall into the wrong hands ("user threat"). A blatant example of user threat is Edward Snowden, who managed to steal an estimated 200,000 classified NSA files. The present embodiment may substantially reduce such security threats.

The security layer may reside at the operating system ("OS") level and may function as an extension of the data shell game. The security layer may provide a plurality of safeguards that may be implemented in software running on a processor, other hardware, or any combination thereof, to enhance data security and obfuscation by removing a user's ability to directly interact with discernible data once data is processed in a manner consistent with the present disclosure. User threat may substantially disappear when users no longer have the means to access discernible data. The security layer may constrain data in such a manner that a user never has access to discernible information once it is created and/or saved in a manner consistent with the present embodiment.

The security layer may include two virtual memory areas: the user space 609, and the kernel space 610. The security layer may also include a kernel driver (not shown), residing in at least one computing device 130 in FIG. 1.

The user space may include at least one dynamic link library (DLL) 601 for dispersing and reassembling information in a manner consistent with the present disclosure, at least one administrator graphical user interface (GUI) 605 for building and maintaining at least one default parameters file 611, which stores metadata that regulates and controls the actions of the DLL 601, at least one password GUI 615 for inputing passwords required for high-security direct network connections, at least one deletion GUI 616, for deleting a file, or plurality of files, on and off the global cloud 202 in FIG. 2, and a user authentication GUI 606, for inputting user login credentials. The user space may also include at least one on-the-fly enabled file folder (OEF) 604, which may reside in the user space to facilitate dispersing and reassembling information in a manner consistent with the present disclosure, and an interface layer (IL) 602, which may be implemented as a user-mode service that runs in the background with no user interface. The IL may integrate the actions, processes, and functions of the DLL with other actions, processes, and functions of the security layer. At least one launch file 612 may be created when original data is disassembled. The launch file is a small a file that contains metadata needed to reassemble an original file in a manner consistent with the present disclosure. Launch file 612 may be stored in a folder (not shown) until it is expressly deleted by a process of the DLL 601.

The kernel space 610 may include a local staging area (LSA) 603, which provides at least one block of virtual memory to store at least one user credential and/or at least one encryption key 618, and at least one default parameters file 611. Furthermore, LSA 603 may temporarily cache non-dispersed information and/or reassembled information 613 and 614. The default parameters file 611 may store user-specific metadata that is accessed by the DLL 601. A cached original file 613 is a data file or data stream that is temporarily cached in the LSA 603 until it is dispersed in a manner consistent with the present disclosure. A cached reassembled file 614 is a data file or data stream that was reassembled from share volumes, according a process of the present disclosure, which is temporarily waiting to be transferred to a software application or folder.

In some embodiments, the non-dispersed information and/or reassembled information may not be cached in the LSA 603. Instead, the kernel driver may divide the non-dispersed information and/or reassembled information into pages in memory and pass the pages directly to the OS without caching the non-dispersed information and/or reassembled information in the LSA 603.

One of skill in the art will appreciate that the user space may also include, but not be limited to, additional GUIs to perform specific actions in support of DLL operations, additional DLLs, multiple OEFs, help GUIs, and support GUIs, among others to support or enhance the actions of users.

In one example of a user interaction with the security layer, a user may boot up computing device 130 in FIG. 1, which may cause the IL service to launch the authorization GUI 605, whereby the user may enter credentials to log into the security layer. Thereafter, a user may be restricted to performing only a limited number of allowable interactions ("interactions") with respect to data. Interactions may be presided over by the at least the one kernel driver (not shown), the IL 602, the one DLL 601, or any combination thereof. All interactions may be substantially restricted to using the OEF 604 to initiate actions that would process data in a manner consistent with the present disclosure. Some user interactions, for example, that may initiate actions by the OEF 604 may include the following examples. In one example, a user of computing device 130 in FIG. 1 may drag and drop an existing file (which may be one of a group of files, or a folder which may contain subfolders and/or files) into the OEF 604. The kernel driver may intercept the file-drop event, encrypt the original file, and temporarily store it in the LSA 603. Thereafter, the kernel driver may send the filename of the dropped file to the IL 602. The IL 602 may call a dispersal process, or processes, in the DLL 601, whereupon the DLL 601 may perform the work of dispersing the file in a manner consistent with the present disclosure, and return a file validation message to the IL 602 when finished. The IL 602 may then delete the cached original file 613 stored in the LSA 603 and zeroize its memory space. Thereafter, the IL 602 may create a virtual reference stub file ("VRS") and store it in the LSA 603. In another example, a user may launch a software application such as, for example, a word processor to create, for example, an original text document and save it as a file in the OEF 604. The kernel driver may intercept the file-write message from the OS and disperse the original file in a manner substantially similar to the file-drop event described in the previous example. In another example, a user may launch a software application such as, for example, a word processor, and use a file selection dialog to select a file to open by double clicking on its VRS stored in the OEF 604. The kernel driver may intercept the file-read message from the OS and send the selected VRS to the IL 602. The IL 602 may call the reassemble process, or processes, in the DLL 601 and cache reassembled file in the LSA 603. The user may then modify the cached reassembled file and save it in the OEF 604, whereupon the kernel driver may intercept the file-write message from the OS and disperse the file according the file-drop event described in the previous two examples.

One of skill in the art will appreciate there could be additional user interactions other than the examples disclosed above. One of skill in the art will also appreciate that all of these interactions may appear to the user as normal everyday computational activities.

Beneath the user's level of awareness, a plurality of actions and processes may operate in the security layer, some of which may be initiated when a user boots up computing device 130 in FIG. 1, whereupon the computing device may automatically start the IL service 602, and the IL 602 may launch the authentication GUI 606 which may retrieve the user's credentials, transform the credentials, encrypt the credentials, and store the credentials in a memory buffer in the kernel space 610. Then the authentication GUI 606 may zeroize all user space memory (not shown) that was allocated for the authentication process and dispose of the authentication GUI 606.

Thereafter, the user may launch a word processor and write a letter ("Example.doc"), and save the letter in the OEF 604, or so it may seem to the user. Beneath the user's level of awareness, the kernel driver minifilter (not shown) may intercept the file-write command before it gets to the OS and encrypts the original file, rename it with, for example, a GUID, and write it to the LSA 603. Then the kernel driver (not shown) may create a VRS in the OEF 604 that bears the original filename. The contents of the VRS may include at least the GUID filename, the network path of the original file, and other metadata the kernel driver IL, DLL, and OEF may need to function synchronously with one another. If interrogated by a function of the user space 609, the VRS may display the original file's metadata such as, for example, the date/time of creation, modification, and access, the file size, and the file attributes. In addition, the kernel driver may monitor the OS and intercept all attempts to obtain information about the VRS in such a manner that the user has no way of knowing the actual file, for example, Example.doc, does not actually reside in the OEF 604. The kernel driver (not shown) may make the VRS appear to applications just like the real file it represents, however, the real file may be located in either the LSA or in a number of share volume locations targeted by the dispersal operation.

A VRS may appear to a user, or a software application, file explorer, file dialog box, or the like, to be a normal original file. While a user may be able to steal a VRS and examine the VRS in a computing environment which is not presided over by the kernel drive (not shown), the IL 602 and the OEF 604, the VRS would not yield any discernible information since it may be encrypted, or it may be protected by methods of obfuscation such as, for example, those disclosed herein as XIOBC, or it may be protected by any combination thereof.

Exponential Dispersion

The terms "tag" and "tagged" as used interchangeably herein refer to any technique which may be applied to a data file or data stream to give it a special identity to the file system driver minifilter. For example, a file may be given a special file type such as, for example, a file may have a filename such as, Example_Tag.txt, or a file may contain a tag as an extended file attribute, or a file may have a tag attached as an alternate data stream or resource fork, or any other method of identifying a file as special, or any combination such means.

In addition, the utility of system 600 may be expanded to create a multidimensional dispersion of dispersions ("exponential dispersion"). The first dimension of exponential dispersion may be as described above. The first dimension may be accomplished by dispersing and transmitting at least one data file, data stream, launch file, parameters file, or any other form of data construct ("file") to a plurality of conventional file folders as previously disclosed. A second dimension of exponential dispersion may be created by substituting at least one OEF folder in place of at least one of the conventional file folders of the second dimension. When the OEF folder of the second dimension of exponential dispersion receives at least one share volume transmitted by the dispersion process of the first dimension, the OEF folder of the second dimension may disperse the share volume to a plurality of third dimension file folders, at least one of which may also be an OEF folder. When an OEF folder of the third dimension of exponential dispersion receives at least one share volume transmitted by the dispersion process of the second dimension of exponential dispersion, the OEF folder of the third dimension may disperse the share volume to a plurality of fourth dimension file folders, at least one of which may be an OEF folder, and so on. One of skill in the art will appreciate that any number of dimensions could be created in such a manner.

Software running on a processor and/or other hardware constructed and arranged to implement any or all of the teachings of the present disclosure may control processes of an OEF folder to interact with processes of the driver and minifilter to control actions preformed with respect to files or share volumes of the OEF folder. Accordingly, the driver may interact with the software or hardware to tag files or share volumes in a manner whereby logic included in the driver and/or minifilter may receive control information included in or suggested by the tag. For example, the drivers may interact with the software and/or hardware to tag a file or share volume of the OEF folder. The driver and/or minifilter may be configured to automatically disperse an untagged file or share volume. Furthermore, the file or share volume may be tagged in such a manner as to cause the file or share volume not to be dispersed. Instead the file or share volume may be stored in the kernel space according to the manner described herein. Furthermore, the file or share volume may be tagged with one or more XIOBC pointers which derive processing data and/or instructions from a corresponding XIOBC array or table to cause the file to be processed in any of a variety of ways consistent with the present disclosure. For example, the file may be split with a different splitting ratio, or encrypted with a different encryption algorithm, or encrypted with a different encryption key, or any other process or combination thereof.

A second dimension of exponential dispersion may be created by transmitting the file of the first dimension to one or more of a plurality of OEF folders which may be located in a local or remote storage locations, where the dispersed file is tagged with one or more XIOBC pointers to one or more XIOBC arrays or tables which directs the driver interacting with the software and/or hardware to disperse a file or share volume to be dispersed. Thus, contents of each of the OEF folders from the first dimension may themselves be further dispersed by the second dimension. Each dimension may employ the same, or different, IDAs, splitting ratios, encryption algorithms, encryption keys, or any other such process or any combination thereof.

One of skill in the art will appreciate that by using exponential dispersion, in a manner consistent with the present disclosure, any file may be dispersed to the nth dimension. Each new dimension may be a dispersion of a previously dispersed subset, thus creating an interrelated multidimensional dispersed data structure.

All or part of any data processing systems comprising a plurality of computers, networks, and/or datacenters, or any combination thereof may be unified into at least one interrelated multidimensional dispersed data processing system. In addition, multiple hard drives, flash drives, or other such storage devices may be unified into at least one interrelated multidimensional dispersed data storage system, which may be used to enhance, supplement, or replace conventional RAID methodologies. In this manner, almost any collection of storage devices may be unified using exponential dispersion. Storage devices could be of mixed sizes and makes. Furthermore, unified storage devices may reside in a single internal or external computer or storage location, or the all unified storage devices may reside in multiple internal or external computers or storage devices.

Since data of exponential dispersion may be transmitted at storage device data transfer rates over a multitude of pathways, the collective data transfer rate may substantially increase read/write throughput rates for all storage devices.

DBPL—Dispersed Broadband Over Powerline

The term "BPL" as used herein refers to broadband over powerline technology, which is a method of communication that allows high-speed digital data transmission over the electric power distribution wiring. BPL uses a wider frequency range than and different transmission technologies from conventional wired communication technologies such as, for example, telephone and cable TV, to provide high data-rate communication over medium distances.

The term "medium voltage" as used herein refers to alternating electric current which is in the range of about 600 volts to about 25,000 volts.

The term "coupler" as used herein refers to capacitive couplers, inductive couplers, wireless couplers, or any such other means by which BPL data may be injected to and extracted from an electric power cable. Capacitive couplers may be more efficient than inductive couplers but require a physical connection to be made to the electrical cable. Inductive couplers, by contrast, do not require a physical connection, which may be useful for applications such as, for example, meter rooms in apartment blocks.

The term "air card" as used herein refers to a mobile broadband modem, also known as a connect card or data card. An air card is a type of modem that allows a laptop, tablet, personal computer, or router, to access the Internet via a mobile broadband connection instead of using, for example, telephone or cable television lines, or the like. In some embodiments, the air card or other component of the laptop, tablet, personal computer, or router may provide Internet access via cellular, WiFi, Bluetooth, or other connections as well.

FIG. 7 provides a schematic diagram representation of a system 700 for modifying conventional BPL methodologies, according to a disclosed embodiment, to create a hybrid dispersed broadband over powerline communication network ("DBPL") for increasing information security, persistence, and availability of a communication network hosted on an electric power grid in a manner consistent with the present disclosure. System 700 includes: a laptop computer 701; a tablet computer 702; a smart phone; antennas 704 and 705 for bidirectional wireless transmission of digital information; medium voltage electric powerlines 706, 707, and 708 for transmitting electric power and digital information; electrical insulators 709 for isolating medium voltage systems from lower voltage systems; couplers 711, for separating BPL information from medium voltage electrical power; electrical wires ("stingers") 710 for transmission of electrical current and bidirectional transmission of BPL information between medium voltage electrical powerlines 706, 707, and 708 and couplers 711; low voltage data cables 712 for bidirectional transmission of BPL data to at least one BPL head end unit 713, which may include a cell phone base station 730; at least one BPL access point 714, which may include a fiber optic transceiver; fiber optic and/or Ethernet cables 715 for transmitting data; a router 720, for transmitting and receiving data; a head end server 721, for controlling BPL and data transmission processes, and other computing processes; a local storage device 722, for storing and retrieving data; a router 730, for transmitting and receiving data; a laptop computer 731; a workstation 732, and a global cloud 202 of FIG. 2.

Generally, computing devices 701, 702, and 703 may be configured to receive data from wireless antennas 704 and 705. The laptop computing device 701 and the tablet computing device 702 may be configured internally or externally with an air card to facilitate bidirectional transmission of cell phone communications.

Computing devices such as, for example, laptop/notebook computer 731 and workstation 732, may include software running on a processor and/or other hardware for dispersing and reassembling data in a manner consistent with the present disclosure, which may be connected to the global cloud 202 in FIG. 2 and the BPL access point 714 via fiber/Ethernet cables 715 to at least one router 730. Optionally, laptop/notebook computer 731 and workstation 732 may include software running on a processor and/or other hardware for dispersing and reassembling data in a manner consistent with the present disclosure, which may be configured with an electronic circuit such as, for example, a wireless adaptor or air card to connect to BPL access point 714 and global cloud 202 in FIG. 2 via wireless antenna 705.

Wireless antennas 704 and 705 may be configured to bidirectionally transmit audio and/or video bit streams and digital data by utilizing a plurality of wireless technologies such as, for example, 3G, 4G, 4G LTE, WiFi, WiMAX, Mobile VoIP, and the like.

Generally, electrical insulators 709 are connected to couplers 711 using stingers 710. Electrical insulators 709 may be further configured to directly connect to couplers 711, thereby eliminating the need for stingers 710. This may be more economical since it may save installation time and overhead. In addition, eliminating stingers may reduce electrical interference emissions that may result from the stinger connection hardware which is generally a pressure connection that may loosen or corrode over time.

Generally, at least one BPL head end unit 713 may be configured to cross-convert BPL data to and from Ethernet data. The at least one BPL head end unit may further include at least one cell phone base station transceiver to create a hybrid head end unit ("HHE"). Optionally, the cell phone base station transceiver may be housed in a separate enclosure 730 and connected to the at least BPL head end unit 713 using cable 731. Whether or not the cell phone base station transceiver is bundled with the at least one BPL head end unit 713 or housed in a separate enclosure 730, for the purpose of this disclosure the BPL head end unit and the cell phone base station transceiver shall be considered a single functional HHE.

In a manner consistent with the present disclosure, head end server 713 may include software running on a processor and/or other hardware for dispersing and reassembling data in a manner consistent with the present disclosure, which is configured to receive information from a network connection device such as, for example, router 720, which may be connected to the global cloud 202 of FIG. 2, the at least one BPL head end unit 713, the fiber optic base station 730, the head end server 721, or any combination thereof. Optionally, the software running on a processor and/or other hardware may be included in head end server 721, the BPL head end unit 713, or any other such device.

The BPL head end unit 713 may receive information from BPL couplers 711, wireless antenna 704, router 720, or any combination thereof. The included software running on a processor and/or other hardware may parse the received information, in a manner consistent with the present disclosure, into a plurality of first datasets, and disperse each of the plurality of first datasets using a splitting ratio such as, for example, 3-of-6, whereby there are 3 minimum of the 6 maximum shares generated. Thereafter, the 6 maximum shares of each first dataset, which may contain Ethernet data, cell phone data, engineering data, smart grid data, telemetry, or any other type of digital information, may be encoded into BPL data, using an encoding scheme such as, but not limited to, OFDM, and conveyed to the HHE. The HHE may inject, for example, 2 shares into each medium voltage line 706, 707, and 708.

The injected shares may travel as BPL data, generally within a frequency range of about 2 MHz to about 30 MHz, along with the 50 to 60 Hz electrical current, to other locations on the power grid such as, for example, BPL access point 714, by means of couplers 711. Generally, digital signal processing hardware and embedded software in access point 714 may convert the BPL data, cell phone data, engineering data, smart grid data, telemetry, or any other type of digital information, into Ethernet data and/or cell phone data, and convey the Ethernet data to router 730, and cell phone data to wireless antenna 705.

BPL access points such as, for example, access point 714, may be configured to cross-convert BPL data to and from Ethernet data. BPL access point 714 may further include at least one cell phone transceiver to create a hybrid access point ("HAP").

One of skill in the art will appreciate that referring to router 730 may also refer to a switch, a hub, or any other device or means for facilitating network connectivity.

DBPL may be used to overcome many obstacles. One such obstacle is electromagnetic interference ("EMI") that destroys BPL data. Conventional BPL wisdom injects a dataset such as, for example, a movie, into a single medium voltage powerline. While the dataset travels over medium voltage powerline from its injection point to its destination it may encounter multiple EMI sources such as, but not limited to, powerline direction changes, air brakes, and equipment issues. Powerline direction changes may occur because when a first powerline needs to make a turn it is terminated at a pole and a second powerline begins at the pole extending in the desired direction. The first and second powerlines are connected using a short third powerline and two pressure connectors to complete the circuit. Both connectors generally emit some EMI, and one or both connectors may loosen or become corroded over time increasing EMI emissions. Power utility companies may use several types of air brake to control the flow of current over the power grid. When an air brake is closed, and current is flowing through it, it becomes a source of EMI. Furthermore, old transformers, faulty connections to transformers, lights, lightning arrestors, and other such power equipment all emit EMI.

Dispersing a dataset such as, for example, a movie, in a manner consistent with the present disclosure, using a 3-of-6 splitting ratio, and injecting 2 of the maximum 6 shares thus generated into each of the 3 medium voltage lines, may create a robust environment which has a substantially smaller likelihood of suffering degraded signal quality due to EMI emission than other transmission methods or systems. Since the example movie is first parsed into a plurality of second datasets ("slices") and each slice is dispersed into, for example 6 shares, and each share may be hashed, and the hash value stored in the share's header when the share is created, the receiving software running on a processor and/or other hardware can hash the received share and compare it against the stored share. If the values are different, the share may be discarded. Since any 3 of the 6 shares can losslessly reassemble a complete slice, 4 of the 6 shares would have to be lost in order to degrade signal quality. Furthermore, since the movie was parsed into a plurality of slices, a loss of 4 shares would only affect a single slice. Therefore, the greater the number of slices comprising the movie, the lower the probability of signal degradation.

Other considerations are data security and network throughput speed. Datasets processed in a manner consistent with the present disclosure and transmitted over a BPL communication network according to the teachings of the present embodiment may have substantially similar benefits to those disclosed in system 500, the GDVD.

An additional benefit may also be derived by applying the obfuscation and bandwidth conservation techniques disclosed in system 400 of the present disclosure. BPL data carrier frequencies may be allocated into about 10 or more channels ("channels"). Generally, all BPL head end units and access points use autoconfiguration files to control and optimize BPL signal processing. Generally, channels are not all the same with respect to their properties. For example, some channels are better for long distance backhauls, while others are better for short distance hauls. The embodiments described herein do not need to be as general purpose as convention BPL wisdom and may therefore require the use of fewer channels. Consistent with the teachings of the present embodiment, it may improve signal quality if the chipset's frequency allocation table, which assigns frequency ranges to respective channels, could be reallocated to function in a manner similar to the way outmoded television broadcast towers allocated frequencies, which was to divide frequency ranges in such a manner that each active channel was bounded by an inactive channel on either side. The inactive channels may reduce interference and improve the signal quality of the active channels. Certain signal processing methods may also be applied to the active channels to improve the signal quality. In addition, frequency allocation may be dynamically configured on-the-fly to respond to varying network conditions. By applying the XIOBC techniques of system 400, an autoconfiguration file and frequency allocation table could be rapidly modified, even during high EMI conditions. A single 256 cell XIOBC table may be preloaded into the non-volatile memory of BPL head end units and access points. The XIOBC table may contain all of the commands and control information to modify the autoconfiguration files and frequency allocation tables by sending the BPL head end units and access points a small number of 1 byte pointers. Each pointer may be split into two 4-bit nibbles which could function as an x-y coordinate that indicates the location of a cell in the XIOBC table. Using this technique, an autoconfiguration file, for example, that needs to be modified with the following commands:
GENERAL_USE_AUTOCONF=yes;
GENERAL_MAC_MODE=ACCESS;
GENERAL_TYPE=HE; GENERAL_FW TYPE=LV;
GENERAL_AUTHENTICATION=none;
GENERAL_STP=yes; GENERAL_SIGNEL_MODE=6;
AGC_TX_GAIN=0; QOS_ENABLE=no;
VLAN_ENABLE=no; OVLAN_ENABLE=no; could be constructed by sending the BPL head end unit and access point only 11 bytes of XIOBC data. This technique may further address potential security issues, according to the practice of the data shell game, since an intruder that may read the 11 bytes may be unable to discern any usable information without reversing engineering the BPL head end unit or access point. The obfuscation strength of the 11 bytes may be further enhanced by, for example, deterministically hiding the 11 bytes in a larger random byte array, or by encrypting the 11 bytes, or by any other such techniques or combination of techniques.

Low Power Cell Phone Signal Transmission System

The embodiments described herein may be useful as a cell phone signal transmission system which may be used with the BPL system described above. Conventional cell phone technology uses large multi-antenna array towers that are generally from about 15 m to about 60 m in height, which typically support a plurality of antennas that may transmit up about 1,664 frequencies ("channels"), each channel typically transmits about 100 watts of effective radiated power ("ERP") per channel over distances of typically about 35 km to a maximum of about 70 km in open areas and from typically about 2 km to about 3 km in densely populated areas. Cell phone tower antennas typically transmit about 800 channels comprised of radio frequency ("RF") waves. The inverse square law states that RF signal strengths become weaker by the distance squared. That is why conventional cell towers typically transmit vast amount of RF energy over relatively long distances. Cell phone tower transmissions must survive several inherent limitations imposed by the physics of transmitting RF energy over such distances. Among them are: the inverse square law, line of sight transmission, landscape topology, weather conditions, reflection and absorption of RF energy by hills, buildings, vegetation, and other such obstacles. Thus, it is fair to say, conventional cell phone transmission technology is based on high-power, brute force tactics to overcome inherent limitations, much the same as television broadcasting towers. The present embodiment teaches a low power cell phone transmission system ("LPC") for economically reducing the impact inherent limitations may have on cell phone transmission quality and service. For example, LPC may employ antennas mounted on electric utility poles that transmit low power signals of about 1 watt to about 5 watts of RF energy over distances of about 150 m to about 2.5 km. One of skill in the art will appreciate that LPC should consume substantially less electric power to supply cell phone coverage than conventional cell phone technology. Furthermore, since antennas may be mounted lower to the ground, and each cell created by each antenna may be significantly smaller, channel reuse may be more efficient, which may allow more users per square mile of coverage. In addition, since medium voltage electric utility poles are ubiquitous on populated landscapes, adopting LPC may reduce the need to build additional cell phone towers, which are generally expensive and aesthetically intrusive, to keep pace with an ever escalating demand. Moreover, utility poles are typically about 11 m high (above ground) and are set from about 38 m apart to about 60 m apart. LPC antennas mounted on utility poles may rise and fall and meander with the contours of the landscape and, as a consequence, may provide more uniform quality of service than other means. For example, data may be conveyed over a BPL network to the LPC antennas, which may transmit the data to and from computing devices in the local area of the LPC antenna.

DDRM—Dispersed Digital Rights Management

The term "title" as used herein refers to the distinguishing name of a recorded or filmed audio and/or video asset such as, for example, the distinguishing name of a movie or a musical composition, or other such work.

The term "content" as used herein refers to a plurality of titles.

The term "provider" as used herein refers to any legitimate manufacturer, distributor, retailer, reseller, exhibitor, or other such entity, of content.

The term "device" as used herein refers to any electronic device which is able to exhibit, to a user thereof, an audio and/or video presentation such as, for example, a computer, set top box, digital video recorder, smart phone, pod, pad, tablet, slate, or other such device.

The term "player" as used herein refers to a software application running in a device which is able to exhibit an audio and/or video presentation from data which is processed in a manner consistent with the present disclosure.

Figure 8A:
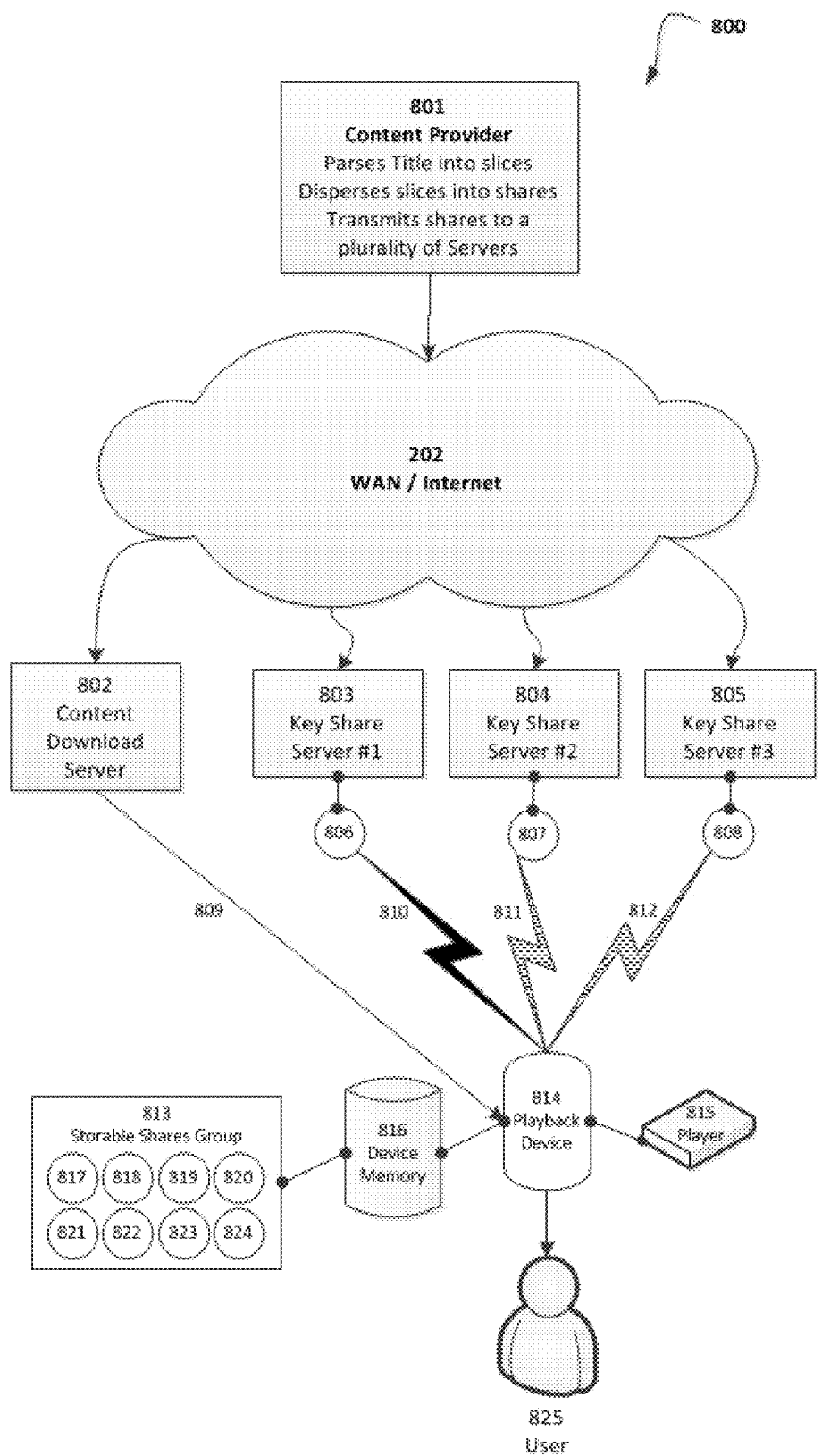

FIG. 8a is a schematic diagram representation of system 800 for an ultra-secure dispersed digital rights management system ("DDRM") that provides data security, persistence, and high-availability for protecting content from loss or copyright piracy by, for example: a provider 801; parsing a title into at least two first datasets (not shown); dispersing each of the at least two first datasets into a plurality of second datasets ("shares") 807, 808, 809, 810, 817, 818, 819, 820, 821, 822, 823, and 824; storing the shares in storage locations (not shown) connected to at least one content download server 802 and at least one key share server 803, 804, 805, and 806; and/or transmitting at least one key share 807, 808, 809, and 810 by at least one transmission path 812, 813, 814, and 815, over a communication network in a manner consistent with the present disclosure to at least one device 825 operated by at least one user ("user") 828.

When user 828 requests 830 of FIG. 8b, a title 834 of FIG. 8b from a provider 801, the provider receiving the request may transmit a plurality of shares (the storable shares group 816) to be stored on the device memory 826 of the user's device 825. A player 827 running in the device 825 may receive a storable shares group 816 from the provider 801 and store the storable shares group 816 in the device memory 826, wherein it may reside until it is expressly deleted.

When a user 825 activates the player's play function, the player 827 may parse all of the shares comprising the storable shares group 816 for the title requested and, near simultaneously, request a key share 807, 808, 809, and 810. Depending upon external factors such as network availability, current data throughput loads, latency factors, and the like, a key share server may be selected such as, for example, key share server #1 803, and the selected share server may start streaming key share 807 over transmission path 812 to the device 825 in such a manner that key share 807 can be received by the player 827 and combined with the shares comprising the storable shares group 816 to reassemble the minimum number of the total shares to exhibit the title on the device 825.

FIG. 8b is a flow chart diagram representation of system 800 for processing content whereby at least one title 834 may be parsed into at least two first datasets 835, and optionally compressed and/or dispersed into at least two second datasets 836, for example, using a 9-of-12 splitting ratio according to an embodiment of the invention. At least one each of the at least two second datasets may be stored in the memory of the at least one content download server 841, and the at least one key share ("key shares") stream server 838. Another of the at least two second datasets ("stored shares") may be stored in the at least one content download server 841. In addition, key shares and stored shares may be stored in the memory of, or memory attached to, servers in a manner consistent with the teachings disclosed according to FIG. 1, system 100. Key shares and stored shares may also be stored in the memory of, or attached to, servers located in a plurality of globally separated datacenters in a manner consistent with the teachings disclosed according to FIG. 5, system 500.

The system 800 may receive a user request for a title and search for stored shares associated with the title 830. The request may be sent to a distribution entry point associated with a provider of the title, the request may be authenticated, and share generation may be authorized 831. If the request did not come from a valid user, the share generation may not be authorized, and the process may end. However, if the authentication reveals that the user is valid, and if stored shares for the title already exist, a key share may be parsed, dispersed, and stored 832. If the stored shares do not already exist, all stored shares may be parsed, dispersed, and stored 833. Thus, the title may be retrieved 834. The title may be divided into two or more slices 835. An information dispersal algorithm may be used to transform each slice into data primitives and divide the primitives into shares 836. Key shares may be generated 837, and one key share may be send to the requesting device 839. Also, if stored shares do not exist for the title, they may be generated 840 and sent to the requesting device 842. The following discussion provides some additional details consistent with embodiments of the process illustrated in FIG. 8*b*.

Software that implements the processing of content in a manner consistent with the present disclosure may run automatically as a server-side service ("service") in the at least one key share server 838, in the at least one content download server 841, and/or such other servers as may be needed. In further conformity with this embodiment, when a user 825, requests a title 834, the request is sent to the provider's distribution entry point such as, for example a store or website 831. The request may be validated to determine if it is coming from an authorized user 828. If the request is valid, the player 827 may search the device's memory 826 for the title's storable share group 816 and 841. If the requested storable share group 816 and 841 is not present, the player 827 may cause the service to reassemble the stored shares into an intermediate dataset ("intermediate") that is losslessly identical to the original title dataset in a manner consistent with the present disclosure. Further, the intermediate may be parsed, optionally compressed, and/or dispersed in a manner consistent with the present disclosure to generate at least one key share group 838, and to generate at least one stored shares 817, 818, 819, 820, 821, 822, 823, and 824, grouped into storable share group 816 and 841. Further, the storable share group 816 and 841 may be downloaded to the device memory 826 of device 825 whereby the player 827 may cause device 825 to store the storable share group 816 and 841 in the device memory 826. The player 827 then may cause the service to stream at least one key share 807, 808, 809, and 810 to device 825 in such a manner that the at least one key share such as, for example, key share 807 can be received by the player 827 and combined with the storable shares comprising the storable shares group 816 and 841 to reassemble the minimum number of the total shares and exhibit the title on the device 825 for the user 828.

One of skill in the art will appreciate that the example may describe any number of content providers, any number of titles, any number of first datasets, any number of second datasets, any number of content download servers, any number of key share servers, any number of transmission paths, any number of devices, and any number of users.

The conventional method of selling, renting, and distributing titles is generally accomplished by burning titles onto hard media, such as a CD, DVD, or Blu Ray optical disc or by downloading titles over a communication network such as the global cloud. Titles are generally encrypted in some manner to make them resistant to acts of piracy. Despite this, providers such as, for example, Viacom and Comcast, estimate that up to 80% of all titles presently in the possession of users got there through acts of piracy. Consequently, the industry is forced to sustain its operations from revenues generated by the remaining 20% of legitimate users, who bear the financial burden for such losses. Numerous encryption schemes have been employed, and more are being developed to prevent acts of piracy but, generally, not long after a new form of encryption appears in the marketplace, maverick programmers distribute software applications known as "rippers" which remove the encryption, facilitating free and open distribution of titles. Encryption schemes have proven to be only temporary fixes. A more permanent solution, for example DDRM, may help combat this problem.

The present disclosure addresses the issue of content piracy by using the scientific principal of data dispersion to deconstruct ("disassemble") all forms of content into indiscernible data primitives. The present embodiment teaches a process ("process") which employs server-side and/or client-side software running on a processor and/or other hardware to mathematically parse titles into slices and then disassemble the slices into data primitives, which are metaphorically speaking, a bit-soup. The process accomplishes the disassembly in such a manner there may be an extremely low likelihood that original data constructs, such as characters, digits, symbols, bytes, or other such digital construct, survives the process intact. This deconstruction may be controllable and losslessly reversible. Titles protected in such a manner may be safely transmitted over unprotected data transmission networks such as, for example, the Internet to wireless cyber cafes, school libraries, and other such locations, with little to no regard for external protections, like Secure Socket Layer ("SSL"), Transport Layer Security ("TLS"), Internet Protocol Security ("IPsec"), Secure Shell ("SSH"), and the like. The process may make it possible and practical to securely store titles in public or private cloud facilities with little to no regard for the facilities' security measures such as firewalls, Tripwire, Firehost, virtual private networks ("VPN"), and the like.

DDRM—A DDRM Business Model

The term "store-and-forward" as used herein refers to a telecommunications technique in which information is sent to an intermediate station where it is stored and played (e.g., shown, presented, delivered, exhibited, and the like) at a later time. It has proven utility in situations when there are long delays in transmission, as well as variable and high error rates, or if a direct end-to-end connection is not available.

The term "streaming" as used herein refers to a technique for delivering multimedia content that is constantly received by and presented to an end-user in real time or near real time while being delivered by a provider. The term refers to the delivery method of the medium rather than the medium itself. The technique facilitates a client-side media player to begin exhibiting the data such as, for example, a movie, before the entire file has been transmitted. This delivery technique may be distinguished from most other delivery systems which are either inherently real time (e.g., radio, television) or inherently nonstreaming (e.g., books, DVDs, Blu Ray, CDs).

An additional embodiment which uses system 800 to provide a technology foundation to create an integrated transmission, storage, and distribution business model which is mutually beneficial to content providers and legitimate users alike. Practicing this embodiment may allow providers to create a novel sales and distribution business whereby titles may no longer be distributed on hard media, such as a CD, DVD, or Blu Ray optical disc.

A hybrid store-and-forward/streaming model for rental, sale, and distribution of digital assets may be created by, for example, by parsing at least one title into at least two slices and dispersing each of the at least 2 slices into at least 2 shares.

At least one share may be transmitted to at least one storage server connected to a communication network, and another share may be transmitted to at least one streaming server connected to a communication network. The storage and streaming locations may be geographically separated from one another or they may reside in the same geographic location. Storage and streaming locations may be on the cloud, off the cloud, or they may be both.

The dispersion ratio ("splitting ratio") may be as minimal as 2-of-3, whereby 3 is the maximum number of shares and 2 the minimum number of the maximum shares which are needed to reassemble a slice. The splitting ratio can be of any maximal size that is practical to serve the needs of a given set of circumstances such as, for example, a 9-of-12 splitting ratio may prove useful.

If a 9-of-12 splitting ratio is used to disperse a title, 16 stored shares (2 slices—8 shares each) may be downloaded by a player and stored on the device's memory, and the remaining 8 shares (2 slices×4 shares) can serve as key shares. The key shares may be divided between, for example, 4 streaming locations from which they would be stored and streamed to users as needed. This technique may provide resilience and persistence by assuring that key shares are, in all likelihood, always available anywhere a device can connect to a communication network.

The present embodiment provides multiple benefits to content providers and users alike, by making it possible and practical to create at least one novel business model for distributing titles to users. For example, one or more providers could operate a subscription service ("service") that provides a digital storefront such as, for example, a website whereby at least one user could subscribe ("subscriber").

Owing to the control and copyright protection afforded by system 800, a provider may make available all titles to all subscribers. Titles may always be wholly owned by providers. Subscribers may download any number of titles at, for example, no cost or low cost. Subscribers may, or may not, be encouraged to share their titles with friends and family. If Subscribers are allowed to share their stored shares, it may hasten the adoption and propagation of the service and reduce the provider's server traffic load, and may further reduce bandwidth and distribution costs. The present embodiment makes open ended file sharing possible and practical since all that is being shared is ⅞ths of the combined data primitives dispersed throughout the stored shares.

The stored shares on a subscriber's device may only possess 89% of the required dispersion. It may, at first glance, appear that it would not be very difficult to fill the empty spaces left open by the missing 11%, but that is not true. The missing 11% does not include whole intact pieces of the stored shares such as, for example, characters, digits, symbols, bytes, or other type of data construct. The missing 11% includes data primitives, which are pieces of the pieces. The perplexity of cracking the DDRM security may be roughly analogous to removing 11% of an atom's subatomic particles. If such an action could be accomplished, only chaos would remain. Until the key shares and the stored shares are brought together, and mathematically reassembled by the information dispersal algorithm that disassembled them, there may be no discernible pattern or form that could be extrapolated or interpolated from the data primitives in the stored shares. The stored shares are essentially equivalent to white noise in this sense.

When a subscriber requests a title, the player may search an index of all titles stored on the device. If the title exists, the player may request a key share only from the authority. If it does not exist, the player may trigger the event to download the title's stored shares. The download event may, or may not, require validation by the authority that the user originating the request was a subscriber in good standing. If subscribership validation is not required by the provider, it may accelerate more rapid adoption of the service. For example, if a user could download up to a certain number of titles on a "try before you buy" basis, the user could try out the service without revealing any personal information other than an email address. This method is commonly practiced by the software industry because it is safe to do so. It is not commonly practiced by providers because content piracy is such an extreme threat. When the only thing users possess is data primitives until they become subscribers, the conventional content distribution model may be discarded and a new paradigm such as, for example, the present embodiment, may wholly or partially replace it.

After a user becomes a subscriber, the authority can check the subscriber's credentials and, if a request for a title is validated to be submitted by a subscriber, the authority may trigger the key share stream server to stream one or more key stares (as needed) to the subscriber's device and immediately begin playback. Depending upon the anticipated latency between request and playback, the player may choose to reassemble the a substantial portion of the title prior to starting playback or the player may start playback as soon as there is a sufficient quantity of reassembled slices in memory. In many cases, only the smallest practicable number of key share slices may be accepted by the device on a load as needed basis.

Once the data primitives comprising the key share are reassembled with the stored shares, the key share may be zeroized. This may be done byte by byte at the moment each key share is read into memory, or it may be desirable for a selectable number of bytes to remain un-zeroized in order to allow subscribers to stop and rewind the player for a specified duration. In effect, the bytes comprising the key shares evaporate the moment each byte was used or shortly thereafter.

The present embodiment provides a plurality of benefits to subscribers such as, for example, subscribers could economically have access to a much wider selection of titles.

Devices may store a seemingly unlimited number of titles. The reason this is true has as much to do with human behavior as it does with technology. It is axiomatic that users constantly desire new titles. Presently, when users hear or view an appealing title they may buy it or, more often than not, steal it. Once they gain possession of the title they generally play it repeatedly at first but, as time goes on, they play it less and less frequently until they play it hardly at all, or never. This is especially true of music files. It is not uncommon for users to possess hundreds, or even thousands, of music and video files. The Player may maintain a "last played" index for all its stored titles. A user may set the player to restrict its title storage space allocation to prevent title storage from interfering with other device memory functions. When the title storage space allocation is full, and the user wants to store another title, the player may delete the oldest played title. The user should not care about losing it since there may be a multitude of titles stored on the device and there is a statistical likelihood that many of them may never be played again. If however, a user wants to play a title that was deleted from memory, nothing is lost, the only inconvenience might be some latency while a deleted title is downloaded. Once downloaded, the title would become the most recently played title in the queue.

An additional benefit of this embodiment is it is highly unlikely that subscribers will ever lose titles. If the device is stolen, destroyed, erases its memory, or dies of unknown causes, all titles it stored in memory will probably be available from providers. Therefore, if a subscriber backed up the stored shares onto another memory device, the stored shares can be easily restored and, if not, they may be restored in the normal course of selecting titles to play.

Another benefit derived from the present embodiment may be lower cost of service for subscribers, and higher revenues and lower operating cost for providers. In addition to reducing the incidence of content piracy and restoring justice, the present embodiment may create an operating environment whereby providers would experience increased revenues and lower cost of goods sold, which may result in higher profit margins. It is also likely that competitive pressures may lower the cost of service for users which, in its turn, may drive increased sales for providers.

The techniques provided by the present embodiment may make it possible for providers to distribute titles on a "try before you buy" basis, which may further drive increased sales for providers.

One of skill in the art will appreciate that the example may also be used to protect the distribution of copyrighted computer software applications, as well as multimedia and other digital assets.

DEM—Dispersed Email and Messaging

Figure 9:
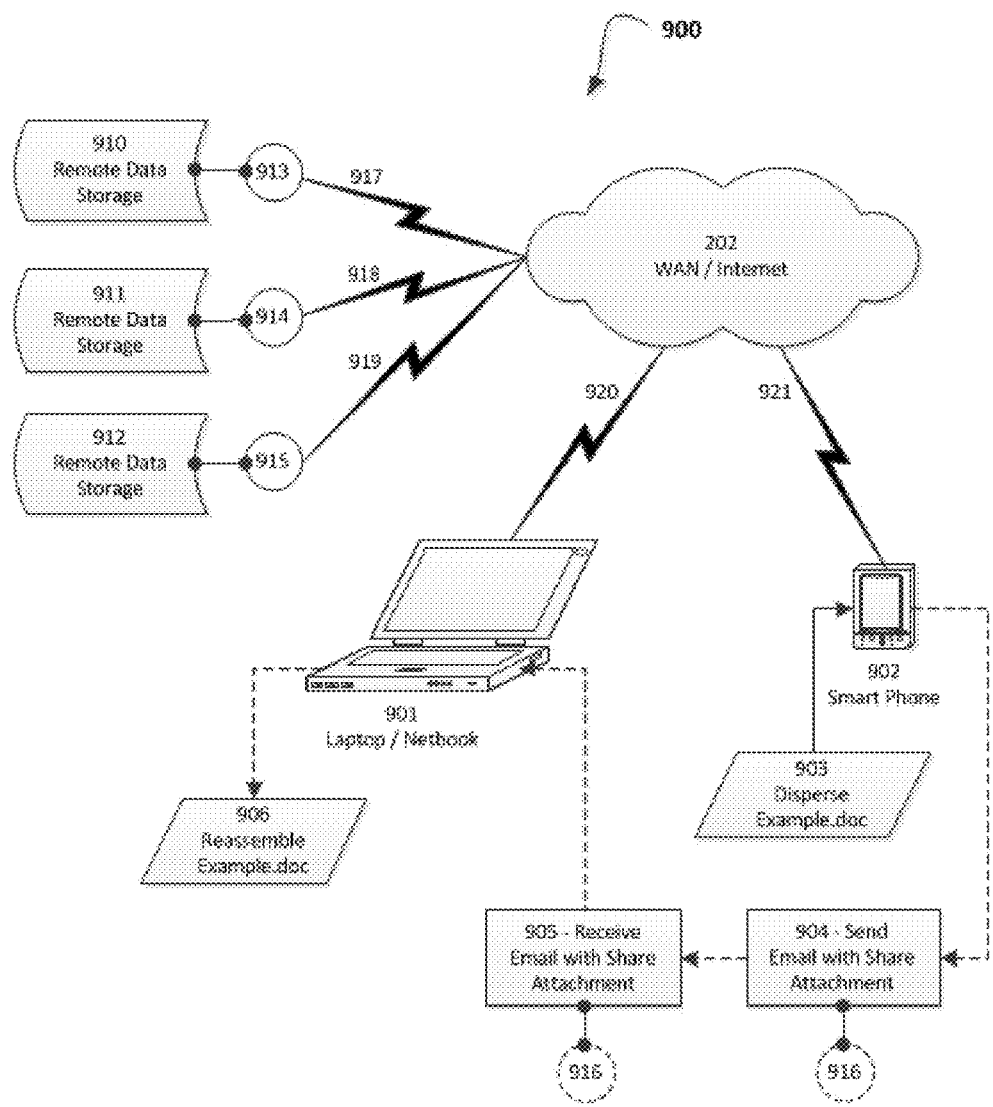
FIG. 9 is a schematic diagram representation of a system 900 for securely transmitting and receiving dispersed email and instant messaging over a communication network according to a disclosed embodiment.

FIG. 9 provides a schematic representation of a secure email system 900 for transmitting, receiving, and storing email or text messaging information according a disclosed embodiment. System 900 includes a global cloud 202 in FIG. 2, remote data storage locations 910, 911, and 912, network paths 917, 918, 919, 920, and 921, a laptop or notebook computing device 901, a smart phone 902, an OTF-enabled folder 603(#1) of system 600 residing in the file system of laptop/notebook 901, and an OTF-enabled folder 604(#2) of system 600 residing in the file system of smart phone 902.

Sensitive information such as, for example, a birth date, social security number, credit card number, or any other type of sensitive dataset the owner of which wants kept secret, may be safely transmitted over an unsafe network path 920 and 921 from one computing device to another such as, for example, from computing device (e.g., smart phone) 902 to computing device 901, by dispersing the sensitive dataset 903, in a manner consistent with the present disclosure using, for example, a splitting ratio of 2-of-4 shares, and conveying 1 share 913, 914, and 915 to each of the remote locations 910, 911, and 912, over network paths 917, 918, and 919. In addition, a fourth share 916 may be conveyed as an email attachment from, for example, smart phone 902 to, for example, a laptop or notebook computer 901. Having received the fourth share 916, a computing device such as, for example, a laptop or notebook computer 901, or smart phone 902, or any other computing device, may reassemble the dispersed sensitive dataset into a second sensitive dataset 906 that is losslessly identical to the first sensitive dataset.

In addition, the process of dispersing and transmitting a sensitive dataset such as, for example, an email attachment, as described above, may be automated by employing the techniques taught by system 600 herein. For example, the fourth share 916 email attachment may be dragged into or otherwise retrieved from an email client software application such as, for example, Outlook, Chrome, Apple Mail, Mozilla Thunderbird, or any other email client that is drag-and-drop enabled to an OTF-Enabled Folder 604 of system 600. The email attachment comprising share 916 may be processed with any of shares 913, 914, or 915, in a manner consistent with the present disclosure to reassemble share 916 and, for example, share 914 into a second sensitive dataset 906 that may be losslessly identical to the first sensitive dataset.

Furthermore, the process of dispersing and transmitting a sensitive dataset may be accomplished by using a browser plug-in, add-in, add-on, or the like, or by using an office or mail client plug-in, add-in, add-on, or the like, which may be configured to create, edit, transmit, and receive an email or a message from one computing device to another via a wired or wireless network. Prior to transmitting an email or message, the plug-in, add-in, add-on, or the like may disperse the email or message in a manner consistent with the present embodiment using, for example, a 2-of-4 splitting ratio and transmit 3 of the 4 shares, for example, 913, 914, and 915 to, for example, remote storage locations 910, 911, and 912.

The fourth share may be transmitted to another computing device configured to receive and reassemble the dispersed email or message into a second email or message that may be losslessly identical to the first email or message. To accommodate secure network transmission, the fourth share may be binary data that may be attached to a textual email or message as an alternate data stream, resource fork, or the like. In other embodiments, the fourth share may be binary data that may be embedded in a text script, email, or message. Secure network transmission may be achieved by processing the fourth share with an encoding utility such as, for example, the uuencode/uudecode utility or the like.

The foregoing teaches systems and methods for securely transmitting and receiving email over a communication network ("email-in-motion"), in a manner consistent with the present disclosure. In some embodiments email-in-motion may be performed in addition to protecting email stored on storage devices and storage media ("email-at-rest") such as, for example, hard drives, flash drives, optical drives, and the like. Accordingly, one or more storage devices of laptop/notebook 601 and/or smart phone 902 may contain at least one OTFenabled folder of system 900, which may be configured to disperse and store information in a manner consistent with the present disclosure, whereby the sensitive information may be substantially more secure, more persistent, and more available than if protected by email-at-rest storage protection methodologies alone.

One of skill in the art will appreciate that in addition to systems and methods for rendering information that is highly compressed and/or indecipherable to unauthorized use, as described above, such systems and methods may also include features to reverse the process and restore data that was so altered or modified back to its original form.

One of skill in the art will further appreciate that the techniques disclosed in embodiment 900 may, with minor modification, be used to build and operate a messaging system for applications such as, for example, secure text messaging and secure mobile ad hoc radio messaging.

While various embodiments of the present disclosure have been described above, it should be understood that they have been presented by way of example only, and not limitation. It will be understood by those skilled in the art that various changes in form and details may be made therein without departing from the spirit and scope of the disclosure. Thus, the breadth and scope of the disclosure should not be limited by any of the above-described exemplary embodiments.

We claim:

1. A system for securely storing and transmitting digital information including:
 a plurality of datacenters;
 a computing device connected to the plurality of datacenters, the computing device comprising a hardware processor; and
 a communication network connected to the plurality of datacenters;
 wherein the hardware processor is configured to:
  parse at least a portion of each of one or more bit streams to form a plurality of first datasets, the one or more bit streams comprising a virtual machine, each of the plurality of first datasets including a portion of each of the one or more bit streams;

disperse the plurality of first datasets as no more than bits into multiple data blocks to form t volumes as part of a plurality of second bit streams such that m number of volumes contain the entirety of the plurality of the first datasets, wherein m<t;

encrypt each of the t volumes with a different encryption key and/or a different encryption algorithm;

assign to each of the t volumes a different, randomly generated, alphanumeric string as a file name; and output the t volumes to the plurality of datacenters such that each datacenter stores less than the entirety of the plurality of the first datasets.

2. The system of claim 1, wherein the datacenters are geographically distributed with respect to one another.

3. The system of claim 1, wherein the computing device is further configured to reassemble the m volumes to instantiate the virtual machine.

4. An apparatus for securely storing and transmitting digital information including:
a computing device connected to a communication network, the computing device comprising a hardware processor configured to:
parse at least a portion of each of one or more bit streams to form a plurality of first datasets, the one or more bit streams comprising a virtual machine, each of the plurality of first datasets including a portion of each of the one or more bit streams;
disperse the plurality of first datasets as no more than bits into multiple data blocks to form t volumes as part of a plurality of second bit streams such that m number of volumes contain the entirety of the plurality of the first datasets, wherein m<t;
encrypt each of the t volumes with a different encryption key and/or a different encryption algorithm;
assign to each of the t volumes a different, randomly generated, alphanumeric string as a file name; and
output less than m volumes to each of a plurality of datacenters via the network such that each datacenter is sent less than the entirety of the plurality of the first datasets.

5. The apparatus of claim 4, wherein the computing device is further configured to reassemble the m volumes to instantiate the virtual machine.

6. An apparatus for securely storing and transmitting digital information including:
a computing device comprising a hardware processor configured to:
receive a request to store one or more bit streams;
parse at least a portion of each of the one or more bit streams to form a plurality of first datasets, each of the plurality of first datasets including a portion of each of the one or more bit streams;
disperse the plurality of first datasets as no more than bits into multiple data blocks to form t volumes as part of a plurality of second bit streams such that m number of volumes contain the entirety of the plurality of the first datasets, wherein m<t;
output the t volumes to a plurality of local or distributed storage locations, such that no complete dataset is stored at a single storage location;
encrypt each of the t volumes with a different encryption key and/or a different encryption algorithm;
assign to each of the t volumes a different, randomly generated, alphanumeric string as a file name; and
generate a virtual reference stub (VRS) file associated with the t volumes.

7. The apparatus of claim 6, wherein the VRS file represents the t volumes as a single file.

8. The apparatus of claim 6, wherein the computing device is further configured to receive the request in response to a user interaction with a user interface comprising dragging and dropping a file into an on the fly (OEF) folder.

9. The apparatus of claim 6, wherein the computing device is further configured to:
receive a request to read the VRS file; and
reassemble the one or more bit streams from the volumes in response to the request.

10. The apparatus of claim 6, wherein the computing device comprises:
a secure user space configured to allow user interaction with data; and
a secure kernel space configured to parse, disperse, and output the data;
wherein the data is not contained within the secure user space at any time.

11. An apparatus for securely storing and transmitting digital information including:
a computing device comprising a hardware processor configured to:
parse at least a portion of each of one or more bit streams to form a plurality of first datasets, each of the plurality of first datasets including a portion of each of the one or more bit streams;
disperse the plurality of first datasets as no more than bits into multiple data blocks to form t volumes as part of a plurality of second bit streams such that m number of volumes contain the entirety of the plurality of the first datasets, wherein m<t;
encrypt each of the t volumes with a different encryption key and/or a different encryption algorithm;
assign to each of the t volumes a different, randomly generated, alphanumeric string as a file name;
output the t volumes to a plurality of local or distributed storage locations, such that each storage location stores less than the entirety of the plurality of the first datasets;
parse at least a portion of each of the t volumes to form a plurality of third datasets, each of the plurality of third datasets including a portion of each of the t volumes;
disperse the plurality of third datasets as no more than bits into multiple data blocks to form v volumes as part of a plurality of second bit streams such that m number of volumes contain the entirety of the plurality of the third datasets, wherein m<v;
encrypt each of the v volumes with a different encryption key and/or a different encryption algorithm;
assign to each of the v volumes a different, randomly generated, alphanumeric string as a file name;
output the v volumes to a plurality of local or distributed storage locations, such that each storage location stores less than the entirety of the plurality of the third datasets.

12. The apparatus of claim 11, wherein the computing device is further configured to repeat the parsing, dispersing, and outputting.

13. A system for securely storing and transmitting digital information including:
a computing device;
a broadband over powerline (BPL) communication network connected to the computing device, the BPL network comprising a plurality of powerlines; and
a cellular communication device connected to the BPL network;
wherein the computing device is configured to:
parse at least a portion of each of one or more bit streams to form a plurality of first datasets, each of the plurality of first datasets including a portion of each of the one or more bit streams;
disperse the plurality of first datasets as no more than bits into multiple data blocks to form t volumes as part of a plurality of second bit streams such that m number of volumes contain the entirety of the plurality of the first datasets, wherein m<t;
encrypt each of the t volumes with a different encryption key and/or a different encryption algorithm;
assign to each of the t volumes a different, randomly generated, alphanumeric string as a file name; and
output the t volumes to a remote device via the BPL network such that each powerline within the BPL network transmits less than the entirety of the plurality of the first datasets; and
wherein the cellular communication device is configured to output the t volumes to a remote device via a cellular network.

14. The system of claim 13, wherein the computing device comprises a BPL head end unit.

15. The system of claim 13, wherein:
the system further comprises the remote device; and
the remote device comprises a head end server configured to receive the t volumes and reassemble the t volumes into the one or more bit streams.

16. The system of claim 13, wherein the cellular network is a low power network.

17. The system of claim 13, wherein the cellular communication device is configured to output the t volumes to the remote device using a plurality of cellular channels such that no complete dataset is transmitted over a single channel within the cellular network.

18. The system of claim 17, wherein the cellular communication device is configured to select the plurality of cellular channels using a BPL allocation table.

19. A system for securely storing and transmitting digital information including:
a computing device connected to at least one of a network device or a storage device or both, the computing device comprising a hardware processor; and
a communication network connected to the at least one of a network device or the at least one of a storage device, or both;
wherein:
the hardware processor is configured to:
parse at least a portion of each of one or more multimedia bit streams to form a plurality of first datasets, each of the plurality of first datasets including a portion of each of the one or more bit streams;
disperse the plurality of first datasets as no more than bits into multiple data blocks to form t volumes as part of a plurality of second bit streams such that m number of volumes contain the entirety of the plurality of the first datasets, wherein m<t;
encrypt each of the t volumes with a different encryption key and/or a different encryption algorithm;
assign to each of the t volumes a different, randomly generated, alphanumeric string as a file name; and
output the t volumes either across a plurality of transmission paths or to a plurality of distributed storage locations in response to a request for display of multimedia content, such that each storage location stores less than the entirety of the plurality of the first datasets or each transmission path transmits less than the entirety of the plurality of the first datasets;
at least a first multimedia bit stream comprises key data;
at least a second multimedia bit stream comprises shared data; and
the key data comprises information required to access the shared data.

20. The system of claim 19, wherein the computing device is further configured to validate the request for display of multimedia content before outputting the t volumes.

21. The system of claim 19, wherein:
the system further comprises a remote device, the remote device comprising a distributed storage location;
each of the t volumes is distributed to the remote device; and
the remote device is configured to receive the t volumes and reassemble the t volumes into the one or more bit streams.

22. The system of claim 21, wherein the remote device is configured to zero or delete the one or more bit streams after receiving the one or more bit streams.

23. The system of claim 21, wherein:
the remote device comprises a subscriber device; and
the one or more multimedia bit streams comprise subscribed or previously purchased content associated with the subscriber device.

24. The system of claim 19, wherein:
the system further comprises a remote device, the remote device comprising a distributed storage location;
at least a first multimedia bit stream comprises a first portion of shared data;
at least a second multimedia bit stream comprises a second portion of the shared data;
the first multimedia bit stream and the second multimedia bit stream are sent successively to the remote device; and
the remote device is configured to reassemble the first multimedia bit stream and the second multimedia bit stream in order to stream the multimedia content.

25. The system of claim 24, wherein:
additional multimedia bit streams comprising additional portions of the shared data are sent to the remote device; and
the remote device is configured to reassemble the additional multimedia bit streams in order to continue to stream the multimedia content.

26. A system for securely storing and transmitting digital information including:
a computing device connected to at least one of a network device or a storage device or both, the computing device comprising a hardware processor; and
a communication network connected to the at least one of a network device or the at least one of a storage device, or both;

wherein the hardware processor is configured to:
parse at least a portion of each of the one or more bit streams to form a plurality of first datasets, each of the plurality of first datasets including a portion of each of the one or more bit streams;
disperse the plurality of first datasets as no more than bits into multiple data blocks to form t volumes as part of a plurality of second bit streams such that m number of volumes contain the entirety of the plurality of the first datasets, wherein m<t;
encrypt each of the t volumes with a different encryption key and/or a different encryption algorithm;
assign to each of the t volumes a different, randomly generated, alphanumeric string as a file name; and
output the t volumes either across a plurality of transmission paths, such that each transmission path transmits less than the entirety of the plurality of the first datasets, wherein at least one of the t volumes is inserted into an email or chat message.

27. The system of claim 26, wherein the computing device is further configured to send a link providing access to at least one of the t volumes in the email or chat message.

28. The system of claim 26, wherein the computing device comprises a plugin for a communication program, the plugin configured to automatically trigger the parsing, dispersing, and outputting.

29. A method for securely storing and transmitting digital information including:
parsing, with a parsing module of a computing device connected to a plurality of datacenters, at least a portion of each of one or more bit streams to form a plurality of first datasets, the one or more bit streams comprising a virtual machine server, each of the plurality of first datasets including a portion of each of the one or more bit streams;
dispersing, with a dispersal module of the computing device, the plurality of first datasets as no more than bits into multiple data blocks to form t volumes as part of a plurality of second bit streams such that m number of volumes contain the entirety of the plurality of the first datasets, wherein m<t;
encrypting, with the dispersal module, each of the t volumes with a different encryption key and/or a different encryption algorithm;
assigning, with the dispersal module, to each of the t volumes a different, randomly generated, alphanumeric string as a file name; and
outputting, with the dispersal module, the t volumes to the plurality of datacenters such that each datacenter stores less than the entirety of the plurality of the first datasets.

30. The method of claim 29, wherein the datacenters are geographically distributed with respect to one another.

31. The method of claim 29, further comprising reassembling, with the computing device, the m volumes to instantiate the virtual machine server.

32. A method for securely storing and transmitting digital information including:
receiving, with a computing device, a request to store one or more bit streams;
parsing, with a parsing module of the computing device, at least a portion of each of the one or more bit streams to form a plurality of first datasets, each of the plurality of first datasets including a portion of each of the one or more bit streams;
dispersing, with a dispersal module of the computing device, the plurality of first datasets as no more than bits into multiple data blocks to form t volumes as part of a plurality of second bit streams such that m number of volumes contain the entirety of the plurality of the first datasets, wherein m<t;
encrypting, with the dispersal module, each of the t volumes with a different encryption key and/or a different encryption algorithm;
assigning, with the dispersal module, to each of the t volumes a different, randomly generated, alphanumeric string as a file name;
outputting, with the dispersal module, the t volumes to a plurality of local or distributed storage locations, such that each storage location stores less than the entirety of the plurality of the first datasets; and
generating a virtual reference stub (VRS) file associated with the t volumes.

33. The method of claim 32, wherein the computing device wherein the VRS file represents the t volumes as a single file.

34. The method of claim 32, further comprising receiving, with the computing device, the request in response to a user interaction with a user interface comprising dragging and dropping a file into an on the fly (OEF) folder.

35. The method of claim 32, further comprising:
receiving, with the computing device, a request to read the VRS file; and
reassembling, with the computing device, the one or more bit streams from the volumes in response to the request.

36. The method of claim 32, wherein the computing device comprises:
a secure user space configured to allow user interaction with data; and
a secure kernel space configured to parse, disperse, and output the data;
wherein the data is not contained within the secure user space at any time.

37. A method for securely storing and transmitting digital information including:
parsing, with a parsing module of a computing device, at least a portion of each of one or more bit streams to form a plurality of first datasets, each of the plurality of first datasets including a portion of each of the one or more bit streams;
dispersing, with a dispersal module of the computing device, the plurality of first datasets as no more than bits into multiple data blocks to form t volumes as part of a plurality of second bit streams such that m number of volumes contain the entirety of the plurality of the first datasets, wherein m<t;
encrypting, with the dispersal module, each of the t volumes with a different encryption key and/or a different encryption algorithm;
assigning, with the dispersal module, to each of the t volumes a different, randomly generated, alphanumeric string as a file name;
outputting, with the dispersal module, the t volumes to a plurality of local or distributed storage locations, such that each storage location stores less than the entirety of the plurality of the first datasets;
parsing, with the parsing module, at least a portion of each of the t volumes to form a plurality of third datasets, each of the plurality of third datasets including a portion of each of the t volumes;
dispersing, with the dispersal module, the plurality of third datasets as no more than bits into multiple data blocks to form v volumes as part of a plurality of second bit streams such that m number of volumes contain the entirety of the plurality of the first datasets, wherein m<v;

encrypting, with the dispersal module, each of the t volumes with a different encryption key and/or a different encryption algorithm;

assigning, with the dispersal module, to each of the t volumes a different, randomly generated, alphanumeric string as a file name; and outputting, with the dispersal module, the t volumes to a plurality of local or distributed storage locations, such that each storage location stores less than the entirety of the plurality of the third datasets.

38. The method of claim 37, further comprising repeating, with the parsing module and the dispersal module, the parsing, dispersing, and outputting.

39. A method for securely storing and transmitting digital information including:

parsing, with a parsing module of a computing device connected to a broadband over powerline (BPL) network comprising a plurality of powerlines, at least a portion of each of one or more bit streams to form a plurality of first datasets, each of the plurality of first datasets including a portion of each of the one or more bit streams;

dispersing, with a dispersal module of the computing device, the plurality of first datasets as no more than bits into multiple data blocks to form t volumes as part of a plurality of second bit streams such that m number of volumes contain the entirety of the plurality of the first datasets, wherein m<t;

encrypting, with the dispersal module, each of the t volumes with a different encryption key and/or a different encryption algorithm;

assigning, with the dispersal module, to each of the t volumes a different, randomly generated, alphanumeric string as a file name;

outputting, with the dispersal module, the t volumes to a remote device via the BPL network such that each powerline within the BPL network transmits less than the entirety of the plurality of the first datasets; and outputting, with a cellular communication device connected to the BPL network, the t volumes to a remote device via a cellular network.

40. The method of claim 39, wherein the computing device comprises a BPL head end unit.

41. The method of claim 39, further comprising:
receiving, with a remote device comprising a head end server, the t volumes; and
reassembling, with the remote device, the t volumes into the one or more bit streams.

42. The method of claim 39, wherein the cellular network is a low power network.

43. The method of claim 39, further comprising outputting, with the cellular communication device, the t volumes to the remote device using a plurality of cellular channels such that no complete dataset is transmitted over a single channel within the cellular network.

44. The method of claim 43, further comprising selecting, with the cellular communication device, the plurality of cellular channels using a BPL allocation table.

45. A method for securely storing and transmitting digital information including:

parsing, with a parsing module of a computing device, at least a portion of each of one or more multimedia bit streams to form a plurality of first datasets, each of the plurality of first datasets including a portion of each of the one or more bit streams;

dispersing, with a dispersal module of the computing device, the plurality of first datasets as no more than bits into multiple data blocks to form t volumes as part of a plurality of second bit streams such that m number of volumes contain the entirety of the plurality of the first datasets, wherein m<t;

encrypting, with the dispersal module, each of the t volumes with a different encryption key and/or a different encryption algorithm;

assigning, with the dispersal module, to each of the t volumes a different, randomly generated, alphanumeric string as a file name; and outputting, with the dispersal module, the t volumes either across a plurality of transmission paths or to a plurality of distributed storage locations in response to a request for display of multimedia content, such that each storage location stores less than the entirety of the plurality of the first datasets or each transmission path transmits less than the entirety of the plurality of the first datasets;

wherein:
at least a first multimedia bit stream comprises key data;
at least a second multimedia bit stream comprises shared data; and
the key data comprises information required to access the shared data.

46. The method of claim 45, further comprising validating, with the computing device, the request for display of multimedia content before outputting the t volumes.

47. The method of claim 45, further comprising:
distributing each of the t volumes to a remote device comprising a distributed storage location;
receiving, with the remote device, the t volumes; and
reassembling, with the remote device the t volumes into the one or more bit streams.

48. The method of claim 47, further comprising zeroing or deleting, with the remote device the one or more bit streams after receiving the one or more bit streams.

49. The method of claim 47, wherein:
the remote device comprises a subscriber device; and
the one or more multimedia bit streams comprise subscribed or previously purchased content associated with the subscriber device.

50. The method of claim 47, wherein:
at least a first multimedia bit stream comprises a first portion of shared data;
at least a second multimedia bit stream comprises a second portion of the shared data; and
the first multimedia bit stream and the second multimedia bit stream are sent successively to a remote device comprising a distributed storage location; the method further comprising:
reassembling, with the remote device, the first multimedia bit stream and the second multimedia bit stream in order to stream the multimedia content.

51. The method of claim 50, wherein:
additional multimedia bit streams comprising additional portions of the shared data are sent to the remote device; the method further comprising
reassembling, with the remote device, the additional multimedia bit streams in order to continue to stream the multimedia content.

52. A method for securely storing and transmitting digital information including:

parsing, with a parsing module of a computing device, at least a portion of each of the one or more bit streams to form a plurality of first datasets, each of the plurality of first datasets including a portion of each of the one or more bit streams;

dispersing, with a dispersal module of the computing device, the plurality of first datasets as no more than bits into multiple data blocks to form t volumes as part of a plurality of second bit streams such that m number of volumes contain the entirety of the plurality of the first datasets, wherein m<t;

encrypting, with the dispersal module, each of the t volumes with a different encryption key and/or a different encryption algorithm;

assigning, with the dispersal module, to each of the t volumes a different, randomly generated, alphanumeric string as a file name; and outputting, with the dispersal module, the t volumes either across a plurality of transmission paths, such that each transmission path transmits less than the entirety of the plurality of the first datasets, wherein at least one of the t volumes is inserted into an email or chat message.

53. The method of claim 52, further comprising sending, with the communication device, a link providing access to at least one of the t volumes in the email or chat message.

54. The method of claim 52, further comprising automatically triggering, with a plugin for a communication program of the computing device, the parsing, dispersing, and outputting.

55. An apparatus for securely storing and transmitting digital information including:
  a computing device comprising a hardware processor configured to:
    parse at least a portion of each of one or more bit streams to form a plurality of first datasets, each of the plurality of first datasets including a portion of each of the one or more bit streams;
    disperse the plurality of first datasets as no more than bits into multiple data blocks to form t volumes as part of a plurality of second bit streams such that m number of volumes contain a complete data set the entirety of the plurality of the first datasets, wherein m<t;
    encrypt each of the t volumes with a different encryption key and/or a different encryption algorithm;
    assign to each of the t volumes a different, randomly generated, alphanumeric string as a file name; and
    output less than m volumes to each of a plurality of storage locations such that each storage location receives less than the entirety of the plurality of the first datasets; wherein:
  each of the volumes has a filename that is different from the filename of any of the other volumes and is different from a filename of the one or more bit streams,
  each of the volumes has a size that is different from the size of at least one of the other volumes,
  each of the volumes has metadata that is different from the metadata of at least one of the other volumes, or
  each of the volumes has a file attribute that is different from the file attribute of at least one of the other volumes, or
  a combination thereof.

56. A method for securely storing and transmitting digital information including:
  parsing, with a parsing module of a computing device, at least a portion of each of one or more bit streams to form a plurality of first datasets, each of the plurality of first datasets including a portion of each of the one or more bit streams;
  dispersing, with a dispersal module of the computing device, the plurality of first datasets as no more than bits into multiple data blocks to form t volumes as part of a plurality of second bit streams such that m number of volumes contain the entirety of the plurality of the first datasets, wherein m<t;
  encrypting, with the dispersal module, each of the t volumes with a different encryption key and/or a different encryption algorithm;
  assigning, with the dispersal module, to each of the t volumes a different, randomly generated, alphanumeric string as a file name; and
  outputting, with the dispersal module of the computing device, less than m volumes to each of a plurality of storage locations such that each storage location receives less than the entirety of the plurality of the first datasets; wherein:
  each of the volumes has a filename that is different from the filename of any of the other volumes and is different from a filename of the one or more bit streams,
  each of the volumes has a size that is different from the size of at least one of the other volumes,
  each of the volumes has metadata that is different from the metadata of at least one of the other volumes, or
  each of the volumes has a file attribute that is different from the file attribute of at least one of the other volumes, or
  a combination thereof.

* * * * *